United States Patent
Kashima et al.

(10) Patent No.: US 8,640,497 B2
(45) Date of Patent: Feb. 4, 2014

(54) METHOD OF MANUFACTURING GLASS SUBSTRATE FOR MAGNETIC DISK AND SYSTEM FOR MANUFACTURING GLASS SUBSTRATE FOR MAGNETIC DISK

(75) Inventors: Ryuuichi Kashima, Shinjuku-ku (JP); Hideki Isono, Shinjuku-ku (JP); Shinji Eda, Shinjuku-ku (JP); Tomotaka Yokoyama, Shinjuku-ku (JP); Tadashi Tomonaga, Shinjuku-ku (JP); Kraisorn Phandon, Amphur Muang (TH); Weeraphan Yayod, Amphur Muang (TH)

(73) Assignees: Hoya Corporation, Tokyo (JP); Hoya Glass Disk (thailand) Ltd., Lamphun (TH)

( * ) Notice: Subject to any disclaimer, the term of this patent is extended or adjusted under 35 U.S.C. 154(b) by 609 days.

(21) Appl. No.: 12/525,251

(22) PCT Filed: Jan. 24, 2008

(86) PCT No.: PCT/JP2008/050948
§ 371 (c)(1),
(2), (4) Date: Jul. 30, 2009

(87) PCT Pub. No.: WO2008/093584
PCT Pub. Date: Aug. 7, 2008

(65) Prior Publication Data
US 2010/0024484 A1    Feb. 4, 2010

(30) Foreign Application Priority Data

Jan. 31, 2007  (JP) ................................ 2007-022418
Jan. 31, 2007  (JP) ................................ 2007-022419
Jan. 31, 2007  (JP) ................................ 2007-022420

(51) Int. Cl.
*C03B 15/00*    (2006.01)

(52) U.S. Cl.
USPC ........... 65/30.14; 65/29.12; 65/29.14; 65/158

(58) Field of Classification Search
USPC ................ 65/30.1, 30.13, 30.14, 31, 60.4, 61
See application file for complete search history.

(56) References Cited

U.S. PATENT DOCUMENTS

| 6,571,964 | B2* | 6/2003 | Jacobson et al. | ............ 211/41.12 |
| 6,595,028 | B1* | 7/2003 | Miyamoto et al. | ........... 65/30.14 |
| 2003/0121284 | A1 | 7/2003 | Ikeda et al. | |
| 2003/0172677 | A1 | 9/2003 | Miyamoto et al. | |
| 2003/0220183 | A1 | 11/2003 | Kurachi et al. | |
| 2005/0284179 | A1 | 12/2005 | Isono et al. | |
| 2007/0060455 | A1* | 3/2007 | Takayama et al. | ............... 483/39 |

FOREIGN PATENT DOCUMENTS

| JP | 11-349354 | A | 12/1999 |
| JP | 2001-167427 | A | 6/2001 |
| JP | 2003-036528 | A | 2/2003 |
| JP | 2003-146705 | A | 5/2003 |
| JP | 2004-199841 | A | 7/2004 |

OTHER PUBLICATIONS

Mason et al., "Statistical Design and Analysis of Experiments—With Applications to Engineering and Science", Copyright 2003, John Wiley & Sons, 2nd Edition, p. 460-495.*
Singapore Written Opinion and Search Report corresponding to Singapore Patent Application No. 200905112-9, dated Dec. 17, 2010.

* cited by examiner

*Primary Examiner* — Matthew Daniels
*Assistant Examiner* — Lisa Herring
(74) *Attorney, Agent, or Firm* — Sughrue Mion, PLLC

(57) ABSTRACT

To provide a magnetic-disk glass substrate manufacturing method that can reduce the inner diameter dimensional error. A magnetic-disk glass substrate manufacturing method of this invention including a chemical strengthening step of bringing a plurality of glass substrates 102 into contact with chemical strengthening treatment solutions of a plurality of chemical strengthening treatment baths 130, respectively, to chemically strengthen the glass substrates further includes an inner diameter measuring step of measuring the inner diameter of each of the glass substrates 102 before the chemical strengthening step, a grasping step of grasping a variation of the inner diameter of the glass substrate 102 to be generated by the chemical strengthening step for each of the chemical strengthening treatment baths 130, and a combination determining step of determining the chemical strengthening treatment baths 130, that perform chemical strengthening, based on the variations so that the inner diameters of the glass substrates, whose inner diameters are measured, after the chemical strengthening step become a desired value. In the chemical strengthening step, the glass substrates 102 are chemically strengthened in the determined chemical strengthening treatment baths 130, respectively.

14 Claims, 12 Drawing Sheets

FIG. 11

| CHANGE AMOUNT (μm) | GRINDING AMOUNT (μm) | POLISHING AMOUNT (μm) |
|---|---|---|
| 15.00 | +13.00 | +2.00 |
| 7.50 | +6.00 | +1.50 |
| 5.00 | +4.00 | +1.00 |
| 3.75 | +3.00 | +0.75 |
| 3.00 | +2.50 | +0.50 |
| 2.50 | +2.25 | +0.25 |
| 1.50 | +1.30 | +0.20 |
| 1.00 | +0.80 | +0.20 |
| 0.75 | +0.55 | +0.20 |
| 0.50 | +0.30 | +0.20 |
| 0.25 | +0.05 | +0.20 |

FIG. 12

| CHANGE AMOUNT (μm) | GRINDING AMOUNT (μm) |
|---|---|
| 15.00 | +15.00 |
| 7.50 | +7.50 |
| 5.00 | +5.00 |
| 3.75 | +3.75 |
| 3.00 | +3.00 |
| 2.50 | +2.50 |
| 1.50 | +1.50 |
| 1.00 | +1.00 |
| 0.75 | +0.75 |
| 0.50 | +0.50 |
| 0.25 | +0.25 |

FIG. 13

| Li CONCENTRATION (ppm) | CHANGE AMOUNT (μm) | GRINDING AMOUNT (μm) | POLISHING AMOUNT (μm) |
|---|---|---|---|
| 50 | 15.00 | +13.00 | +2.00 |
| 100 | 7.50 | +6.00 | +1.50 |
| 150 | 5.00 | +4.00 | +1.00 |
| 200 | 3.75 | +3.00 | +0.75 |
| 250 | 3.00 | +2.50 | +0.50 |
| 300 | 2.50 | +2.25 | +0.25 |
| 500 | 1.50 | +1.30 | +0.20 |
| 750 | 1.00 | +0.80 | +0.20 |
| 1000 | 0.75 | +0.55 | +0.20 |
| 1500 | 0.50 | +0.30 | +0.20 |
| 3000 | 0.25 | +0.05 | +0.20 |

FIG. 15

| DIFFERENCE (μm) | IMMERSION TIME (min) | TEMPERATURE (°C) | Li CONCENTRATION (ppm) |
|---:|---:|---:|---:|
| 15.00 | 180 | 350 | 50 |
| 7.50 | 180 | 350 | 100 |
| 5.00 | 180 | 350 | 150 |
| 3.75 | 180 | 350 | 200 |
| 3.00 | 180 | 350 | 250 |
| 2.50 | 180 | 350 | 300 |
| 1.50 | 180 | 350 | 500 |
| 1.00 | 180 | 350 | 750 |
| 0.75 | 180 | 350 | 1000 |
| 0.50 | 180 | 350 | 1500 |
| 0.25 | 180 | 350 | 3000 |

FIG. 16

| Li CONCENTRATION (ppm) | IMMERSION TIME (min) | TEMPERATURE (°C) | DIFFERENCE (μm) |
|---:|---:|---:|---:|
| 50 | 180 | 350 | 15.00 |
| 50 | 150 | 300 | 10.00 |
| 50 | 120 | 300 | 7.00 |
| 100 | 180 | 350 | 7.50 |
| 100 | 200 | 380 | 10.00 |
| 150 | 180 | 350 | 5.00 |
| 150 | 160 | 370 | 7.00 |
| 200 | 180 | 350 | 3.75 |
| 250 | 180 | 350 | 3.00 |
| 300 | 180 | 350 | 2.50 |
| 500 | 180 | 350 | 1.50 |
| 750 | 200 | 380 | 2.00 |
| 750 | 180 | 350 | 1.00 |
| 1000 | 180 | 350 | 0.75 |
| 1500 | 180 | 350 | 0.50 |
| 3000 | 180 | 350 | 0.25 | ically important.
METHOD OF MANUFACTURING GLASS SUBSTRATE FOR MAGNETIC DISK AND SYSTEM FOR MANUFACTURING GLASS SUBSTRATE FOR MAGNETIC DISK

TECHNICAL FIELD

This invention relates to a magnetic-disk glass substrate manufacturing method including a chemical strengthening process that ion-exchanges part of a glass substrate to carry out chemical strengthening thereof, a magnetic disk manufacturing method, a magnetic disk, and a magnetic-disk glass substrate manufacturing system.

BACKGROUND ART

In recent years, the information recording technique, particularly the magnetic recording technique, has remarkably advanced following the development of information technology. An aluminum substrate has been widely used as a substrate for a magnetic recording medium for an HDD (hard disk drive) or the like being one of media for such magnetic recording. However, following the reduction in size and thickness and the increase in recording density of a magnetic disk, a glass substrate excellent in substrate surface flatness and substrate strength as compared with the aluminum substrate has been increasing in demand.

Further, following the increase in density of the magnetic recording medium, a magnetic head has also shifted from a thin film head to a magnetoresistive head (MR head) and to a giant magnetoresistive head (GMR head), wherein the flying height of the magnetic head from a substrate has been decreasing. There are instances where such a magnetic head mounted with a magnetoresistive effect element causes a thermal asperity failure as its inherent failure. The thermal asperity failure is a failure in which a read error occurs due to heating of a magnetoresistive effect element caused by adiabatic compression of air or contact when a magnetic head passes a minute convex or concave shape on a surface of a magnetic disk while flying over it.

Therefore, with respect to a magnetic head mounted with a magnetoresistive effect element, the surface of a magnetic disk is required to have extremely high-level smoothness and flatness. Further, if a magnetic layer is formed on a glass substrate with dust or foreign matter adhering thereto, convex portions are formed and, thus, high-level cleaning capable of completely removing the dust or foreign matter is also required for the glass substrate.

In addition to the smoothness and flatness of the surface of the magnetic disk, strict precision management is required for dimensional error of the inner diameter of a circular hole formed in the center of the magnetic disk. This is because the dimensional error of an inner peripheral end face of the magnetic disk directly affects the installation precision when the magnetic disk is fitted on a spindle motor of an HDD. Further, when the inner diameter dimensional error is large, there arises a possibility of causing a mechanical error in the stacking servo (writing of servo information on a magnetic disk) implemented before the magnetic disk is assembled into a magnetic disk device such as an HDD or a possibility of causing a problem in fitting to a spindle during disk stacking. The inner peripheral end face of the magnetic disk is small in surface area relative to the main surface and thus when the rotating center of the magnetic disk is offset due to the inner diameter dimensional error, it is difficult to locate a head of the HDD at a correct position on the HDD and thus it becomes impossible to record/reproduce data.

Further, since reading/writing of data is performed while rotating the magnetic disk at high speed, it is necessary to prevent fluctuation of data on the magnetic disk even during that high-speed rotation. Therefore, the precision management of the inner diameter dimensional error of the substrate for the magnetic disk becomes particularly important.

Further, paying attention to data access by the HDD, in order to accurately store/reproduce data on the magnetic disk assembled into the HDD, a servo pattern serving as a positioning index is written on the magnetic disk in advance. This writing of the servo pattern is performed by fitting the magnetic disk on an apparatus called a servo writer. Then, the magnetic disk written with the servo pattern is once removed from the servo writer and then is fitted as a product on the spindle motor of the HDD.

When the inner diameter dimensional error of the magnetic disk is large, the position of the servo pattern and that of the recording/reproducing head of the HDD as a product are offset from each other when assembling the magnetic disk into the HDD and, therefore, data recording/reproduction cannot be performed normally after all. A technique is disclosed that adjusts alignment for correcting such a positional relationship (e.g. Patent Document 1), but there is no radical solution to suppress the inner diameter dimensional error.

As described above, the requirement for the increase in recording density of magnetic disks has been further increasing in recent years and thus the inner diameter dimensional error management much stricter than conventional is required for glass substrates for the magnetic disks.

Patent Document 1: JP-A-2004-199841

DISCLOSURE OF THE INVENTION

Problem to be Solved by the Invention

Such a magnetic-disk glass substrate is formed through a plurality of processes. First, a single wafer is cut into a disk shape and then formed with an inner hole, thereby forming the shape of a glass substrate. Thereafter, an outer peripheral end face and an inner peripheral end face of the cut glass substrate are chamfered and then both end faces are polished. Subsequently, main surfaces of the glass substrate are also polished and, finally, a chemical strengthening treatment is applied to the polished glass substrate. The chemical strengthening treatment can improve the impact resistance and vibration resistance of the glass substrate and thus can prevent the glass substrate from being damaged due to impact or vibration.

The chemical strengthening process that implements this chemical strengthening treatment is carried out by, for example, heating and melting a molten salt of an alkali salt and then immersing the glass substrate as a treatment object in the molten salt (chemical strengthening treatment solution) in a state where the glass substrate is placed in a glass substrate holder, thereby carrying out ion exchange between the glass substrate and the molten salt.

In this event, the inner diameter of the glass substrate differs before and after the chemical strengthening process. That is, a phenomenon occurs such that the glass substrate expands in a direction of the center of the inner diameter to change its inner diameter. This is because when the chemical strengthening treatment is applied to the glass substrate, the compressive stress is produced on the surface of the glass substrate so that the size of the glass substrate changes due to this compressive stress.

Further, the composition of the chemical strengthening treatment solution changes due to a change over time. Specifically, in the chemical strengthening treatment, ions contained in the glass substrate are ion-exchanged for ions contained in the chemical strengthening treatment solution and, therefore, as the chemical strengthening treatment proceeds, the ion-exchanged ions having been contained in the glass substrate increase in the chemical strengthening treatment solution. This change in composition serves as a cause to change the inner diameter dimension of the glass substrate in the chemical strengthening. Since the amount of this change in inner diameter dimension cannot be ignored with respect to the inner diameter dimensional error of the glass substrate required to be managed much more strictly, high inner diameter dimensional precision also including the variation of the inner diameter in the chemical strengthening treatment is required for the glass substrate.

Further, on mass-production of glass substrates, chemical strengthening treatment baths are provided in a plurality of lines, respectively, and independently contain a chemical strengthening treatment solution, and therefore, the composition thereof differs with time among the baths. For obtaining high-level inner diameter dimensional precision, it is necessary to individually control such a plurality of chemical strengthening treatment baths. However, it is difficult to equalize the states of the respective chemical strengthening treatment solutions in the plurality of chemical strengthening treatment baths. If the states of the chemical strengthening treatment solutions are different from each other, the variations of the inner diameters of the glass substrates caused by respective chemical strengthening treatments differ from each other even under the same chemical strengthening treatment conditions.

Further, when the inner diameter of each glass substrate also has some dimensional error after the inner periphery processing process so that the inner diameter of each glass substrate before the chemical strengthening treatment is smaller or greater than a predetermined design value, the inner diameter dimensional precision is worsened, in combination with such a dimensional error, through the chemical strengthening treatment under certain chemical strengthening treatment conditions, resulting in production of a large number of defective products.

As a result of strictly studying the above-mentioned problems, the inventors of this application have found out that, rather making use of the fact that there is variation in inner diameters among the glass substrates before the chemical strengthening process and further that there is variation in variations of the inner diameters among the chemical strengthening treatment baths that implement the chemical strengthening process, the inner diameter dimensional error of a finally obtained glass substrate can be reduced by adjusting a combination between the inner diameter of a glass substrate before performing a chemical strengthening treatment and a variation to be caused by the chemical strengthening treatment and selecting a chemical strengthening treatment bath optimal for chemical strengthening, and have completed this invention.

Further, as a result of assiduously studying the above-mentioned problems, the inventors of this application have found out that the inner diameter dimensional error can be reduced without performing a complicated adjustment of the chemical strengthening treatment conditions by managing, instead of the inner diameter control in the chemical strengthening process, another process such as the inner periphery processing process (inner peripheral end face grinding process or inner peripheral end face polishing process) that processes an inner peripheral end face of a glass substrate, i.e. by sequentially feeding back an inner diameter dimensional error in the chemical strengthening process to the inner periphery processing process, and have completed this invention.

Further, as a result of assiduously studying the above-mentioned problems, the inventors of this application have found out that even if the inner diameter of a glass substrate before a chemical strengthening treatment is deviated from a predetermined design value, it is possible to improve final inner diameter dimensional precision of the glass substrate by grasping, in advance, the relationship between chemical strengthening treatment conditions and a variation (extension amount) of the inner diameter of a glass substrate when the glass substrate is chemically strengthened under such chemical strengthening treatment conditions and carrying out a chemical strengthening treatment under proper chemical strengthening treatment conditions based on a difference between the inner diameter dimension of the glass substrate before the chemical strengthening treatment and a final desired inner diameter value, and have completed this invention.

This invention has been made in view of the above-mentioned problems possessed by the conventional glass substrates and has an object to provide a magnetic-disk glass substrate manufacturing method, a magnetic disk manufacturing method, a magnetic disk, and a magnetic-disk glass substrate manufacturing system, which are new and improved and are capable of reducing the inner diameter dimensional error of a magnetic-disk glass substrate.

In this invention, the inner diameter of a glass substrate is measured and the difference between it and a final desired inner diameter is derived. Then, a selection is made of a chemical strengthening treatment bath that provides a variation approximate to the derived difference. Therefore, even if the inner diameter of a glass substrate changes, a selection is made of a proper chemical strengthening treatment bath on every occasion so that the glass substrate after the chemical strengthening process has a desired inner diameter, and thus, it is consequently possible to manufacture a magnetic-disk glass substrate with a small inner diameter (ID) dimensional error.

Means for Solving the Problem

In order to solve the above-mentioned problem, according to an aspect of this invention, there is provided a magnetic-disk glass substrate manufacturing method comprising a chemical strengthening step of bringing a disk-shaped glass substrate formed with a circular hole in its center into contact with a chemical strengthening treatment solution of one of a plurality of chemical strengthening treatment baths to exchange part of ions contained in the glass substrate for ions in the chemical strengthening treatment solution, thereby chemically strengthening the glass substrate, the method further comprising an inner diameter measuring step of measuring an inner diameter of the glass substrate before the chemical strengthening step, a grasping step of grasping a variation of the inner diameter of the glass substrate to be caused to occur by the chemical strengthening step, at each of the plurality of chemical strengthening treatment baths, and a combination determining step of determining the chemical strengthening treatment bath, that performs chemical strengthening, based on the variations so that the inner diameter of the glass substrate, whose inner diameter is measured, becomes a desired value after the chemical strengthening step, wherein, in the chemical strengthening step, the glass substrate is chemically strengthened in the determined chemical strengthening treatment bath.

In this invention, the inner diameter of a glass substrate is measured and the difference between it and a final desired inner diameter is derived. Then, a selection is made of a chemical strengthening treatment bath that provides a variation approximate to the derived difference. Therefore, even if the inner diameter of a glass substrate changes, a selection is made of a proper chemical strengthening treatment bath on every occasion so that the glass substrate after the chemical strengthening step has a desired inner diameter, and thus, it is consequently possible to manufacture a magnetic-disk glass substrate with a small inner diameter (ID) dimensional error.

In order to solve the above-mentioned problem, according to another aspect of this invention, there is provided a magnetic-disk glass substrate manufacturing method comprising a chemical strengthening step of bringing one of a plurality of disk-shaped glass substrates each formed with a circular hole in its center into contact with a chemical strengthening treatment solution of a chemical strengthening treatment bath to exchange part of ions contained in the glass substrate for ions in the chemical strengthening treatment solution, thereby chemically strengthening the glass substrate, the method further comprising an inner diameter measuring step of measuring an inner diameter of each of the plurality of glass substrates before the chemical strengthening step, a grasping step of grasping a variation of the inner diameter of the glass substrate to be caused to occur by the chemical strengthening step, and a combination determining step of determining the glass substrate to be subjected to the chemical strengthening step based on the variation so that the inner diameter thereof becomes a desired value after the chemical strengthening step, wherein, in the chemical strengthening step, the determined glass substrate is chemically strengthened in the chemical strengthening treatment bath.

In this invention, a variation of a specific chemical strengthening treatment bath is calculated and an optimal glass substrate to be immersed in that chemical strengthening treatment bath is selected from among a plurality of glass substrates. Therefore, even if the chemical strengthening treatment condition of a chemical strengthening treatment solution in the chemical strengthening treatment bath changes with time, a selection is made of a proper glass substrate on every occasion so as to have a predetermined inner diameter and thus it is consequently possible to manufacture a magnetic-disk glass substrate with a small inner diameter (ID) dimensional error.

In order to solve the above-mentioned problem, according to still another aspect of this invention, there is provided a magnetic-disk glass substrate manufacturing method comprising a chemical strengthening step of bringing a plurality of disk-shaped glass substrates each formed with a circular hole in its center into contact with chemical strengthening treatment solutions of a plurality of chemical strengthening treatment baths, respectively, to exchange part of ions contained in the glass substrates for ions in the chemical strengthening treatment solutions, thereby chemically strengthening the glass substrates, the method further comprising an inner diameter measuring step of measuring an inner diameter of each of the plurality of glass substrates before the chemical strengthening step, a grasping step of grasping a variation of the inner diameter of the glass substrate to be caused to occur by the chemical strengthening step for each of the plurality of chemical strengthening treatment baths, and a combination determining step of determining the chemical strengthening treatment baths, that perform chemical strengthening, based on the variations so that the inner diameters of the plurality of glass substrates, whose inner diameters are measured, become a desired value in the chemical strengthening step, wherein, in the chemical strengthening step, the plurality of glass substrates are chemically strengthened in the determined chemical strengthening treatment baths, respectively.

In this invention, the inner diameters of a plurality of glass substrates and variations of a plurality of chemical strengthening treatment baths are calculated and, in order to finally obtain the glass substrates having a desired inner diameter, the optimal chemical strengthening treatment baths are selected for the plurality of glass substrates, respectively. Therefore, even if the inner diameter of each glass substrate changes or even if the chemical strengthening treatment condition of a chemical strengthening treatment solution in each chemical strengthening treatment bath changes with time, a selection is made of a proper combination between the glass substrate and the chemical strengthening treatment bath on every occasion so as to obtain a predetermined inner diameter and thus it is consequently possible to manufacture a magnetic-disk glass substrate with a small inner diameter (ID) dimensional error.

The combination determing step may determine the chemical strengthening treatment baths for performing chemical strengthening, so that the sum of squares of differences becomes minimum between the desired value of the inner diameter and final estimated inner diameters resultinf from respective combinations obtained when the glass substrates and the chemical strengthening treatment baths are temporarily combined.

Even if one of combinations between the glass substrates and the chemical strengthening treatment baths is good, the whole combination including the other combinations is not necessarily optimal. Therefore, with the above configuration using the method of least squares, it is possible to reduce the whole inner diameter dimensional error.

The grasping step may grasp the variation based on a concentration of a specific component contained in the chemical strengthening treatment solution.

Furthermore, in order to solve the above-mentioned problems, according to a certain aspect of this invention, there is provided a magnetic-disk glass substrate manufacturing method comprising an inner periphery processing step of processing an inner peripheral end face of a disk-shaped glass substrate formed with a circular hole in its center, and a chemical strengthening step of bringing the glass substrate into contact with a chemical strengthening treatment solution to exchange part of ions contained in the glass substrate for ions in the chemical strengthening treatment solution, thereby chemically strengthening the glass substrate, the method further comprising a grasping step of grasping a deformation of an inner diameter of the glass substrate by the chemical strengthening step, wherein, in the inner periphery processing step, based on a grasping result of the grasping step, the inner peripheral end face of the glass substrate is processed so that the inner diameter after the subsequent chemical strengthening step becomes a desired shape.

In this invention, a variation of the inner diameter of a glass substrate in the chemical strengthening step is grasped and, on the assumption that such a change will also occur from next, processing of an inner peripheral end face is performed at a stage preceding to the chemical strengthening step so that the inner diameter of the glass substrate finally becomes a desired value. With this configuration, it is possible to reduce the inner diameter dimensional error of a magnetic-disk glass substrate without performing a complicated adjustment of the chemical strengthening treatment conditions.

In order to solve the above-mentioned problems, according to another aspect of this invention, there is provided a magnetic-disk glass substrate manufacturing method comprising an inner periphery processing step of processing an inner peripheral end face of a disk-shaped glass substrate formed with a circular hole in its center, and a chemical strengthening step of bringing the glass substrate into contact with a chemical strengthening treatment solution to exchange part of ions contained in the glass substrate for ions in the chemical strengthening treatment solution, thereby chemically strengthening the glass substrate, the method further comprising a grasping step of grasping a variation of an inner diameter of the glass substrate to be deformed by the chemical strengthening step, and a processing amount determining step of determining, based on a grasping result of the grasping step, a processing amount of the inner diameter of the glass substrate so that the inner diameter of the glass substrate after the subsequent chemical strengthening step becomes a desired value, wherein, in the inner periphery processing step, the inner peripheral end face of the glass substrate is processed based on the processing amount.

In this invention, a variation of the inner diameter of a glass substrate in the chemical strengthening step is grasped and, on the assumption that such a change will also occur from next, processing of an inner peripheral end face is performed at a stage preceding to the chemical strengthening step so that the inner diameter of the glass substrate finally becomes a desired value. With the above closed-loop configuration that feeds back a result to the inner periphery processing step as a processing amount based on such a variation, the inner diameter dimensional error in the chemical strengthening step can be absorbed in the step at the preceding stage. Thus, it is consequently possible to manufacture a magnetic-disk glass substrate with a small inner diameter (ID) dimensional error without performing a complicated adjustment of the chemical strengthening treatment conditions.

The inner periphery processing step may comprise an inner peripheral end face grinding step of grinding the inner peripheral end face and an inner peripheral end face polishing step of polishing the inner peripheral end face. Reflection of the grasping result of the grasping step may be carried out by one or both of the inner peripheral end face grinding step and the inner peripheral end face polishing step.

With this configuration, the processing amount anticipating the variation can be securely reflected on the inner diameter processing of the glass substrate. The inner peripheral end face grinding step can take a greater machining allowance as compared with the inner peripheral end face polishing step and further the cutting amount per unit time is large, and thus the control is easy. Therefore, it is possible to achieve an increase in efficiency of the manufacturing processes as compared with the inner peripheral end face polishing step.

The grasping step may grasp the variation from a difference between inner diameters of the glass substrate before and after the chemical strengthening step.

In either one of the above-mentioned magnetic-disk glass substrate manufacturing methods, the grasping step may grasp the variation based on a concentration of a specific component contained in the chemical strengthening treatment solution.

In either one of the above-mentioned magnetic-disk glass substrate manufacturing methods, the grasping step may grasp the variation using a variation table in which the concentration of the specific component and the variation are mapped to each other.

With this configuration, without calculating, in real time, a multidimensional relational expression between the concentration of the specific component and the variation, the variation can be easily derived from the concentration only by referring to the variation table prepared in advance. Accordingly, the processing load can be reduced and, further, it is possible to avoid a deviation of the variation due to rounding error when deriving a multidimensional function.

Furthermore, in order to solve the above-mentioned problems, according to a certain aspect of this invention, there is provided a magnetic-disk glass substrate manufacturing method comprising a chemical strengthening step of bringing a disk-shaped glass substrate formed with a circular hole in its center into contact with a chemical strengthening treatment solution to exchange part of ions contained in the glass substrate for ions in the chemical strengthening treatment solution, thereby chemically strengthening the glass substrate, the method further comprising an inner diameter measuring step of measuring an inner diameter of the glass substrate before the chemical strengthening step and a chemical strengthening treatment condition determining step of determining a chemical strengthening treatment condition of the chemical strengthening step based on a difference between the measured inner diameter and a desired inner diameter after the chemical strengthening step, wherein, in the chemical strengthening step, the glass substrate is chemically strengthened based on the determined chemical strengthening treatment condition.

In this invention, first, the inner diameter of a glass substrate is measured and the difference between it and a final desired inner diameter is derived. Then, the chemical strengthening treatment condition is determined so that a variation in the subsequent chemical strengthening step follows the derived difference. With this configuration, even if the inner diameter of the glass substrate before the chemical strengthening treatment is deviated from a predetermined design value, the final inner diameter of the glass substrate can be made to a desired value by adjusting the variation and thus it is possible to manufacture a magnetic-disk glass substrate with a small inner diameter dimensional error.

The chemical strengehtning treatment condition may be at least one selected from a group consisting of (a) a concentration of a specific component contained in the chemical sstrengthening treatment solution and (b) an immersion time of the glass substrate in the chemical strengthening treatment solution.

In the chemical strengthening step, mainly (a) the concentration of a specific component contained in a chemical strengthening treatment solution and (b) the immersion time of a glass substrate in a chemical strengthening treatment solution and a variation of the inner diameter of the glass substrate have a correlation therebetween. Therefore, even if the chemical strengthening step is carried out by fixing one of the chemical strengthening treatment conditions, the variation can be adjusted by changing the other chemical strengthening treatment condition and thus it is possible to reduce the inner diameter dimensional error of the glass substrate after the chemical strengthening step.

The chemical strengthening treatment condition determining step may determine the chemical strengthening treatment condition using a strengthening condition table in which the difference and the chemical strengthening treatment condition are mapped to each other.

With this configuration, without calculating, in real time, a complicated relational expression between the difference and the chemical strengthening treatment condition, the chemical strengthening treatment condition can be easily derived from the difference only by referring to the strengthening condition table prepared in advance. Accordingly, the processing load can be reduced and, further, it is possible to avoid a deviation of the chemical strengthening treatment condition due to rounding error when deriving a multidimensional function.

There are also provided a magnetic-disk glass substrate manufacturing system that implements the magnetic-disk glass substrate manufacturing method described above, a magnetic disk manufacturing method including a step of forming at least a magnetic layer on a surface of a glass substrate obtained by the magnetic-disk glass substrate manufacturing method, and a magnetic disk thus manufactured and used as a magnetic recording medium.

Such a magnetic recording medium may be a perpendicular magnetic recording medium in which a magnetic layer is magnetized perpendicularly to the magnetic disk plane. Since the perpendicular magnetic recording medium is further increased in recording density as compared with a horizontal (in-plane) magnetic recording medium, even an inner diameter dimensional error allowed for the horizontal magnetic recording medium cannot be allowed for the perpendicular magnetic recording medium. Therefore, a magnetic recording medium according to this invention capable of reducing the inner diameter dimensional error is also effective as a perpendicular magnetic recording medium.

Effect of the Invention

As described above, according to this invention, it is possible to reduce the inner diameter dimensional error of a magnetic-disk glass substrate.

BRIEF DESCRIPTION OF THE DRAWINGS

FIG. 11 is a table showing processing amounts (grinding amount and polishing amount) when a variation is fed back, in a shared manner, to both an inner peripheral end face grinding process and an inner peripheral end face polishing process.

FIG. 12 is a processing amount table when a variation is fed back as only a grinding amount of the inner peripheral end face grinding process.

FIG. 13 is a table in combination of the variation table and the processing amount table.

FIG. 15 is an explanatory diagram showing an example of a strengthening condition table tabling the correlation between the difference ($\mu$m) and the concentration (ppm) of Li ions.

FIG. 16 is an explanatory diagram showing the correlation between the concentration of Li ions, the immersion time, and the temperature and the variation in such chemical strengthening treatment conditions.

DESCRIPTION OF SYMBOLS

Figure 1:
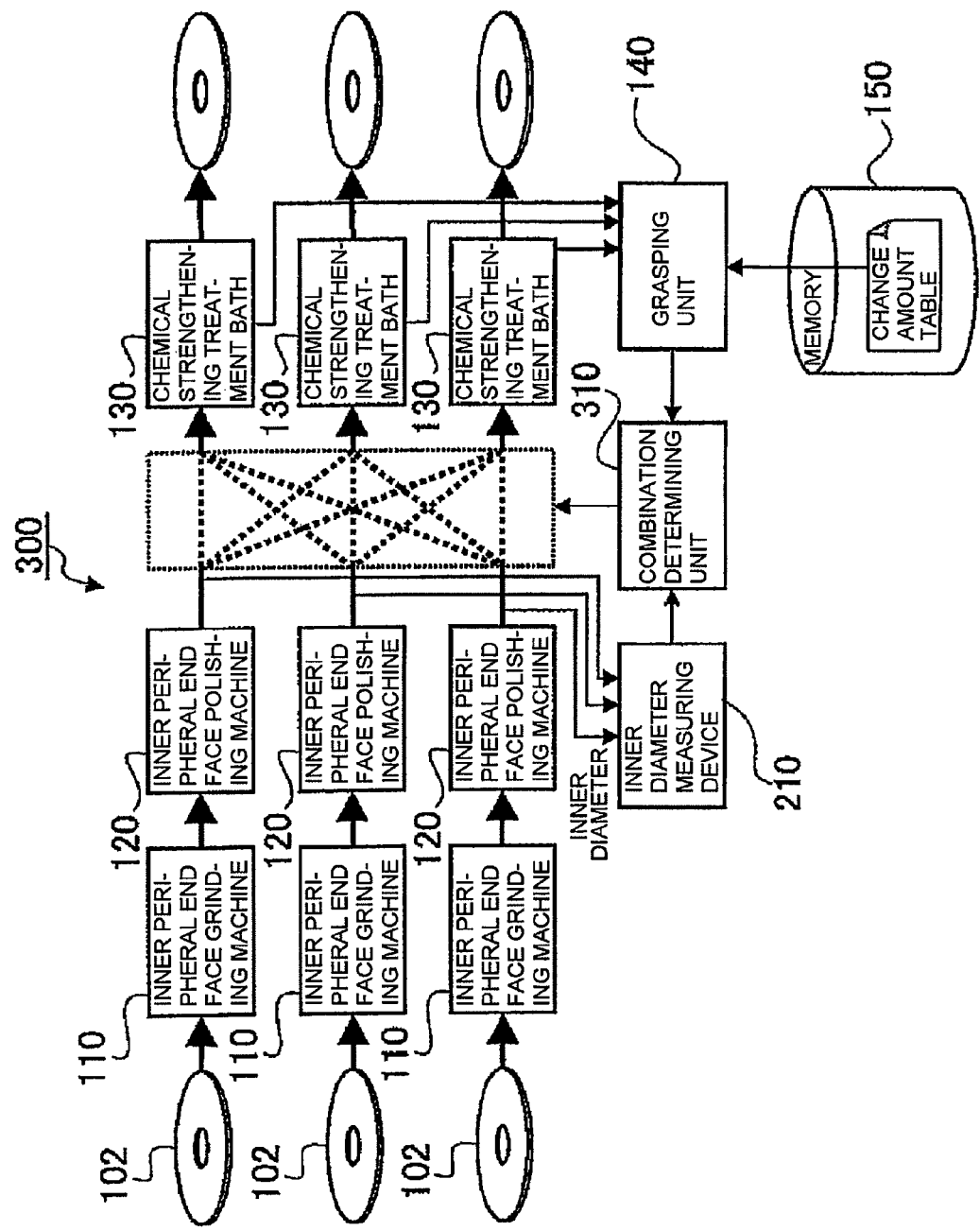
FIG. 1 is a functional block diagram showing a magnetic-disk glass substrate manufacturing system.

100, 200, 300 magnetic-disk glass substrate manufacturing system
102 glass substrate
110 inner peripheral end face grinding machine
112 circular hole
114 inner peripheral end face
120 inner peripheral end face polishing machine
130 chemical strengthening treatment bath
140 grasping unit
160 grinding amount determining unit
170 polishing amount determining unit
210 inner diameter measuring device
220 strengthening condition determining unit
310 combination determining unit

BEST MODE FOR CARRYING OUT THE INVENTION

Preferred embodiments of this invention will be described in detail hereinbelow with reference to the accompanying drawings. In this description and the drawings, the same symbols are assigned to components having substantially the same functional structures, thereby omitting redundant description thereof.
(Adjustment of Combination of Glass Substrate with Chemical Strengthening Treatment Bath)

With the reduction in size and thickness and the increase in recording density of a magnetic disk, the inner peripheral end face of a glass substrate is strictly required to have high-level smoothness and flatness. This embodiment aims at reducing a final inner diameter (ID) dimensional error of a glass substrate by paying attention to an inner peripheral end face of the glass substrate, particularly to a variation thereof in a chemical strengthening process. Hereinbelow, a description will be given of a magnetic-disk glass substrate manufacturing system 300 capable of carrying out a series of processes including the chemical strengthening process.

FIG. 1 is a functional block diagram showing the magnetic-disk glass substrate manufacturing system 300 according to this embodiment. Herein, thick-line arrows represent the flow of processing of glass substrates 102 and thin-line arrows represent the flow of information. The magnetic-disk glass substrate manufacturing system 300 of FIG. 1 comprises inner peripheral end face grinding machines 110, inner peripheral end face polishing machines 120, chemical strengthening treatment baths 130, a grasping unit 140, a memory 150, an inner diameter measuring device 210, and a combination determining unit 310. Herein, in order to facilitate the understanding, the magnetic-disk glass substrate manufacturing system 300 is described by particularly citing manufacturing processes about the inner peripheral end faces of the glass substrates 102, but it is needless to say that the actual processes also include manufacturing processes about the surfaces and outer peripheral end faces of the glass substrates 102.

The above inner peripheral end face grinding machine 110 serves as an inner periphery processing machine and grinds, by a grinding amount, the inner peripheral end face in a circular hole formed at the center of the disk-shaped glass substrate 102 made of, for example, a multicomponent glass. The inner peripheral end face grinding machine 110 can be configured in various ways as long as it can grind the inner peripheral end face of the glass substrate 102 and, for example, it can be formed even by a chamfer machine that grinds the inner peripheral end face simultaneously with chamfering the inner peripheral end face. The above grinding amount is a value obtained by adding a grinding amount determined by a later-described grinding amount determining unit 160 to a grinding amount desired in a grinding process.

Figure 2:
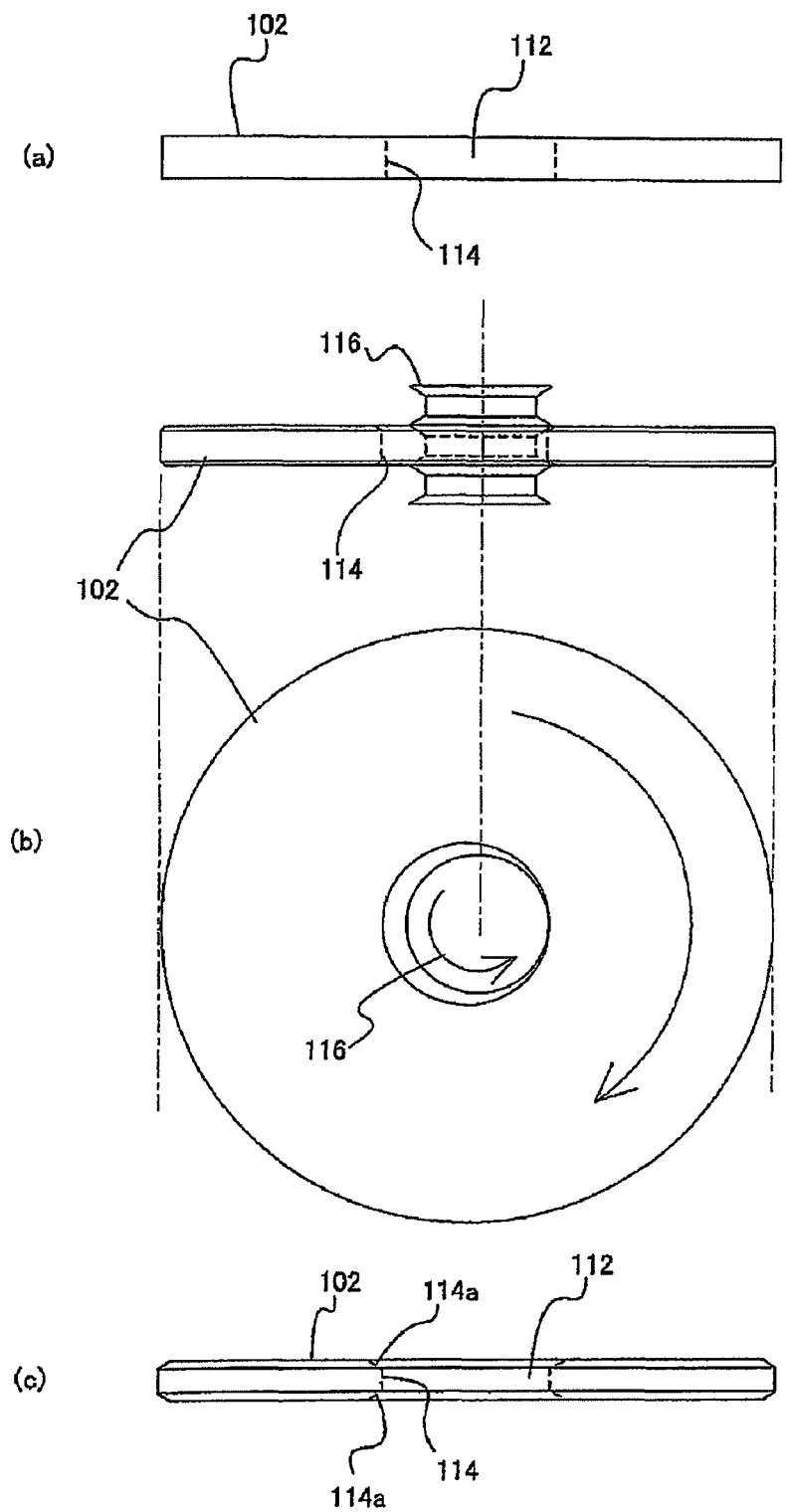
FIG. 2 is an explanatory diagram for explaining a grinding process of an inner peripheral end face grinding machine.

FIG. 2 is an explanatory diagram for explaining the grinding process of the inner peripheral end face grinding machine 110. Herein, grinding and chamfering of an inner peripheral end face 114, which is formed by a circular hole 112 of the disk-shaped glass substrate 102 as shown at (a) in FIG. 2, are carried out.

In the inner peripheral end face grinding machine 110, an inner diameter grinding stone 116 for grinding is inserted into the circular hole 112 as shown at (b) in FIG. 2. The plurality of glass substrates 102 are stacked into a cylindrical shape and upper and lower two bottom surfaces thereof are clasped by a clasping member. The inner diameter grinding stone 116 is a pulley-like rotary grindstone and its outer periphery serves as grinding surfaces.

The glass substrates 102 and the inner diameter grinding stone 116 are rotationally driven by driving means (not illustrated) to which they are fixed, respectively, and the inner diameter grinding stone 116 is brought into contact with the inner peripheral end faces 114 of the cylindrically stacked glass substrates 102, thereby applying uniform inner diameter processing to the respective glass substrates 102. The rotation directions thereof are set so as to be opposite to each other at their contact points. By the inner peripheral end face grinding process described above, there are formed an inner peripheral end face 114 and chamfered surfaces 114a as shown at (c) in FIG. 2. It is also possible to grind the outer peripheral end faces simultaneously with grinding the inner peripheral end faces 114.

The above inner peripheral end face polishing machine 120 serves as an inner periphery processing machine like the inner peripheral end face grinding machine 110 and polishes, further by a polishing amount, the inner peripheral end faces 114 of the glass substrates 102 ground by the inner peripheral end face grinding machine 110. This polishing amount is a value obtained by adding a polishing amount determined by a later-described polishing amount determining unit 170 to a polishing amount desired in a polishing process.

Figure 3:
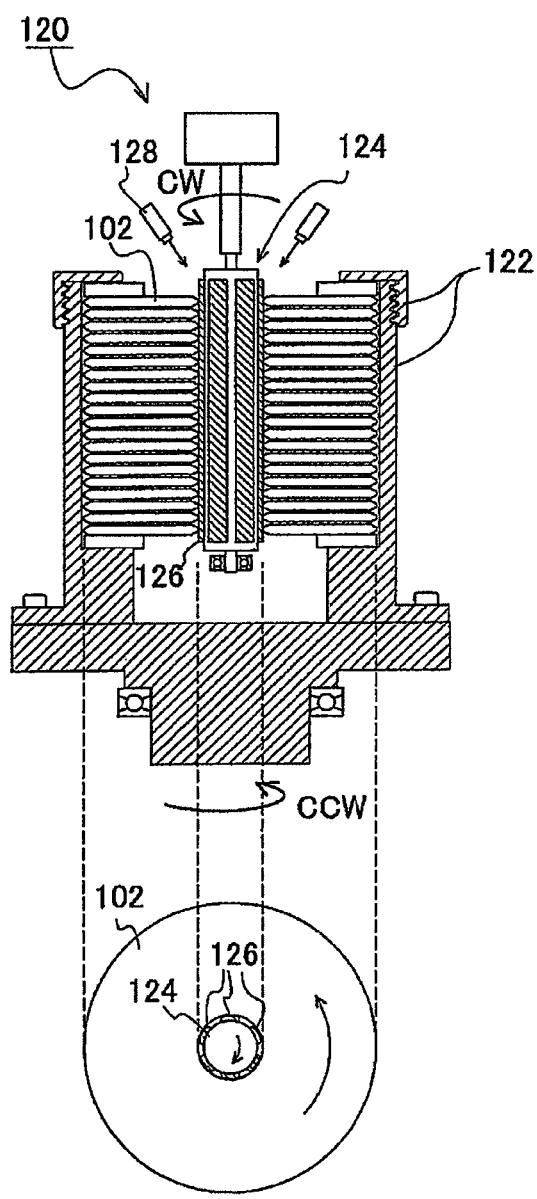
FIG. 3 is a longitudinal sectional view for explaining the structure of an inner peripheral end face polishing machine.

FIG. 3 is a longitudinal sectional view for explaining the structure of the inner peripheral end face polishing machine 120. The plurality of glass substrates 102 stacked into the cylindrical shape are fixed to a fixing portion 122 of the inner peripheral end face polishing machine 120. The inner peripheral end faces of the glass substrates 102 are polished by rotating one or both of the glass substrates 102 and a polishing body 124, inserted into the circular holes of the glass substrates 102, around the disk central axis of the glass substrates 102 used as a rotation center so that the glass substrates 102 and the polishing body 124 rub against each other.

In the polishing body 124, polishing cloths 126 formed by a soft polisher made of a material such as suede or velour, a hard polisher such as hard velour, resin foam, or pitch impregnated suede, or the like may be arranged so as to form part of a cylindrical shape. The polishing body 124 may make a low-speed reciprocating motion (stroke motion) in the rotation axis direction within the circular holes, thereby polishing the entire inner peripheral end faces 114 of the glass substrates 102.

Nozzles 128 of the inner peripheral end face polishing machine 120 supply a polishing solution containing polishing abrasive grains between the polishing body 124 and the glass substrates 102. As the polishing abrasive grains, although depending on a target end-face shape, use can be made of, for example, normal polishing abrasive grains such as alumina, cerium oxide, or colloidal silica. As a dispersing medium in which the polishing abrasive grains are dispersed, there is no particular limitation. Although water is preferable in terms of cost, use can be suitably made of a dispersing medium that is used in normal polishing.

The above chemical strengthening treatment bath 130 comprises a treatment bath containing a chemical strengthening treatment solution and a control portion thereof. The chemical strengthening treatment bath 130 is used in the chemical strengthening process such that the glass substrate 102 is immersed in the chemical strengthening treatment solution obtained by heating and melting a chemical strengthening salt, thereby exchanging ions in part of the glass substrate (aluminosilicate glass containing Li ions), for example, univalent metal ions such as Li ions or Na ions, for univalent ions such as Na ions or K ions in the chemical strengthening treatment solution having an ionic radius greater than that of the above ions. By such an ion-exchange method, a compressive stress layer is formed at the surfaces of the glass substrate and thus it is possible to obtain a large mechanical strength so that fractures or cracks hardly occur.

As the above chemical strengthening treatment solution (treatment molten salt) containing such Na ions or K ions, it is preferable to use a molten salt of sodium nitrate, potassium nitrate, lithium nitrate, or a mixture thereof, but not limited to a nitrate, and use may be made of a sulfate, a bisulfate, a carbonate, a halide, or the like.

Figure 4:
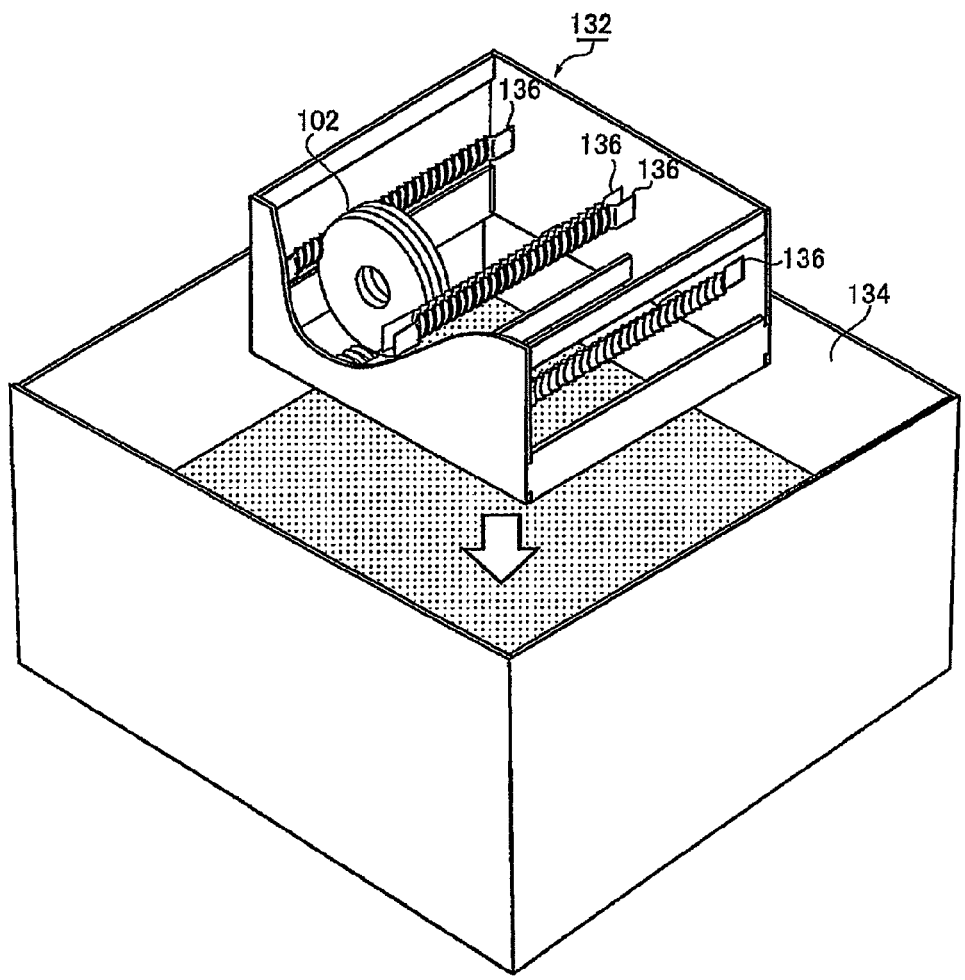
FIG. 4 is an explanatory diagram for explaining immersion of glass substrates into a chemical strengthening treatment solution.

FIG. 4 is an explanatory diagram for explaining immersion of the glass substrates 102 into the chemical strengthening treatment solution. Herein, there are illustrated a glass substrate holder 132 made of a metal material and a treatment bath 134 containing the chemical strengthening treatment solution. The glass substrate holder 132 is provided with holding portions 136 each obtained by bending a plate-like thin plate so as to have a plurality of projecting portions formed in a corrugated fashion in a longitudinal direction on a bulging-side surface. The glass substrates 102 are held one by one in V-shaped grooves formed between the bulging-side projecting portions of the holding portions 136. Then, after all the glass substrates 102 to be treated by one-time chemical strengthening are placed, the glass substrates 102 along with the glass substrate holder 132 are immersed in the treatment bath 134 for a predetermined time.

The temperature of the chemical strengthening treatment solution is preferably set to be about 50 to 150° C. lower than a strain point of the material of the glass substrate 102 and, more preferably, the temperature of the chemical strengthening treatment solution itself is set to about 350 to 400° C. This is because if the temperature is set to less than a value that is 150° C. lower than the strain point of the material of the glass substrate 102, the chemical strengthening treatment is not sufficiently carried out, while, if the temperature is set to higher than a value that is 50° C. lower than the strain point, strain tends to occur in the glass substrate in the chemical strengthening treatment.

By such a chemical strengthening treatment, a compressive stress layer is formed at the surfaces and end faces of the glass substrate 102. The compressive stress layer at the end faces, particularly at the inner peripheral end face, causes deformation of the inner peripheral end face in this embodiment and its expansion (extension) amount is grasped as a variation. The thickness of this compressive stress layer is preferably set to 20 to 150 μm by adjusting the chemical strengthening treatment conditions of chemical strengthening. This is because if it is less than 20 μm, there is a possibility that the strength of the glass substrate 102 is lowered, while, if it exceeds 150 μm, the production efficiency unnecessarily decreases.

Figure 5:
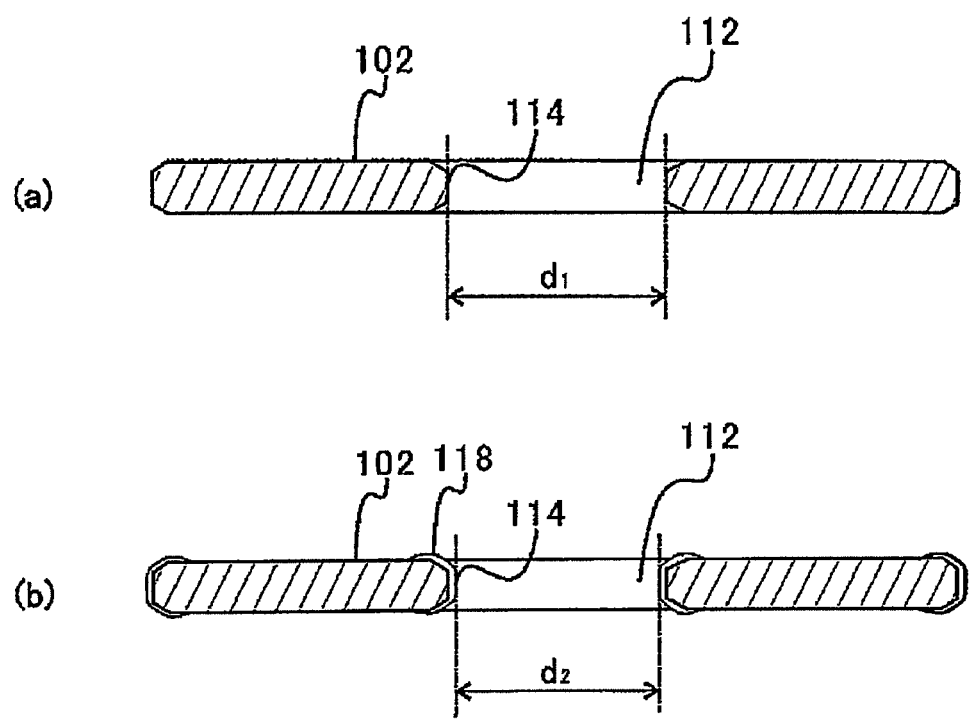
FIG. 5 is an explanatory diagram showing an example of a change in inner diameter dimensional error due to a chemical strengthening treatment.

FIG. 5 is an explanatory diagram showing an example of a change in inner diameter dimensional error due to the chemical strengthening treatment. In the glass substrate 102 finished after the inner peripheral end face polishing process by the inner peripheral end face polishing machine 120, the inner diameter of the circular hole 112, i.e. a distance d1 between portions, facing each other with the center of the circular hole 112 interposed therebetween, of the inner peripheral end face 114, is finished to an inner diameter dimensional error within a predetermined range according to the diameter of the polishing body 124, the concentration of the polishing solution, and the polishing time as shown at (a) in FIG. 5. However, in the chemical strengthening process, as shown at (b) in FIG. 5, a compressive stress layer 118 is formed so that the inner peripheral end face 114 of the glass substrate 102 changes to expand in a direction to reduce the inner diameter, thus affecting the inner diameter dimensional error. Consequently, the inner diameter decreases from d1 to d2.

When mass-producing the glass substrates 102, the chemical strengthening treatment baths 130 described above are provided in a plurality of lines, respectively, and independently contain the chemical strengthening treatment solution. Since it is difficult to equalize the states of the respective chemical strengthening treatment solutions in the plurality of chemical strengthening treatment baths 130, if the states of the chemical strengthening treatment solutions are different from each other, variations of the inner diameters of the glass substrates 102 caused by respective chemical strengthening treatments differ from each other even under the same chemical strengthening treatment conditions.

Therefore, the inventors of this application have found out that, by rather favorably making use of variation in inner diameters among the glass substrates 102 before the chemical strengthening process and distribution in variations of the inner diameters among the chemical strengthening treatment baths 130 that implement the chemical strengthening process, the inner diameter dimensional error of a finally obtained glass substrate 102 can be reduced by adjusting a combination between the inner diameter of the glass substrate 102 before performing a chemical strengthening treatment and a variation to be caused by the chemical strengthening treatment and by selecting the chemical strengthening treatment bath 130 optimal for chemical strengthening.

The above grasping unit 140 grasps (calculates or derives) a variation of the inner diameter of the glass substrate 102 to be deformed by the chemical strengthening process in the chemical strengthening treatment bath 130. The grasping unit 140 grasps the variation by (1) a method of actually measuring a variation of the inner diameter of a glass substrate 102 or (2) a method of estimating a variation from the state of a chemical strengthening treatment solution.

Figure 6:
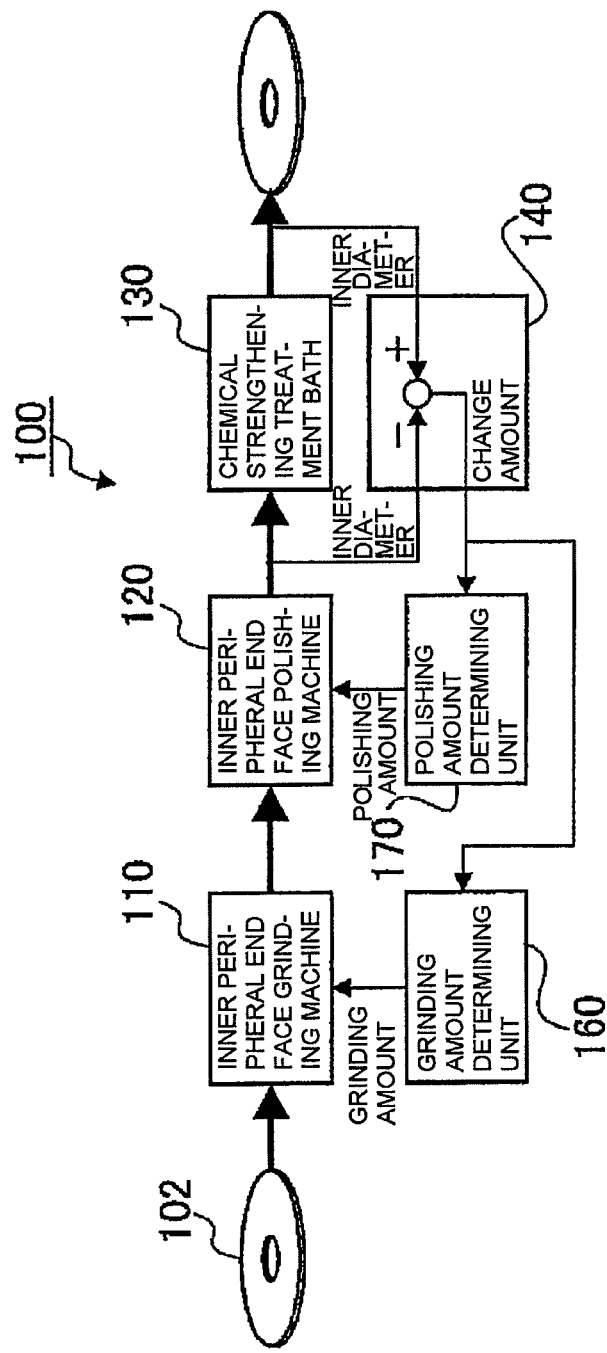
FIG. 6 is a functional block diagram showing an outline when a grasping unit grasps a variation by a method of actually measuring a variation of the inner diameter of a glass substrate.

FIG. 6 is a functional block diagram for schematically describing the case where the grasping unit 140 grasps a variation by (1) a method of actually measuring a variation of the inner diameter of a glass substrate 102. The grasping unit 140 measures the inner diameter of the glass substrate 102 at a stage before the chemical strengthening process and further measures the inner diameter of the same glass substrate 102 at a stage after the chemical strengthening process. Then, by deriving a difference between the inner diameters, the variation is derived. With this configuration, it is possible to accurately grasp an actual variation and thus to set an accurate feedback value (grinding amount or polishing amount).

The variation grasping method of (2) a method of estimating a variation from the state of a chemical strengthening treatment solution is on the basis of the fact that the state of the chemical strengthening treatment solution and the variation have a correlation therebetween. For example, (a) the concentration of a specific component, (b) the cumulative number of treated glass substrates 102, and (c) the cumulative time for treated glass substrates 102 and a variation have a fixed correlation under the same immersion time and the same temperature. Thus, it is possible to grasp or estimate a variation according to one or a plurality of the above chemical strengthening treatment solution states (a), (b), and (c).

At the time of the initial implementation of this magnetic-disk glass substrate manufacturing system 100, it is necessary to determine an initial grinding amount and an initial polishing amount of the inner peripheral end face grinding machine 110 and the inner peripheral end face polishing machine 120 and, therefore, the grasping unit 140 estimates a variation at a stage preceding thereto.

Figures 7, 8:
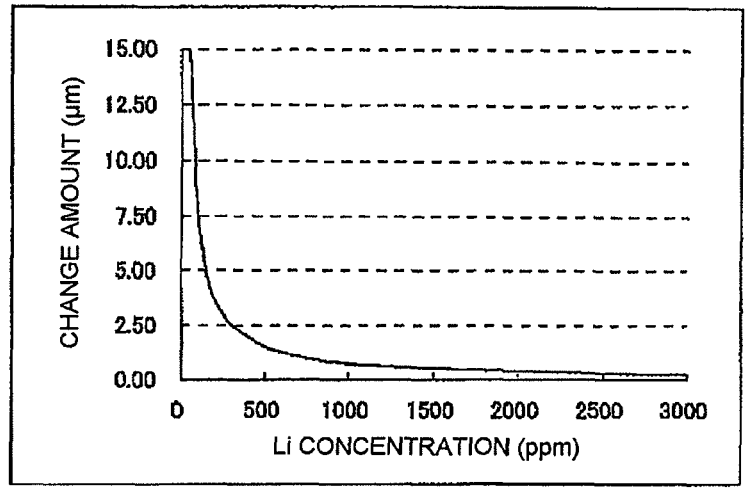
FIG. 7 is a correlation diagram showing the correlation between the concentration (ppm) of Li ions and the variation ($\mu$m).
FIG. 8 is an explanatory diagram showing an example of a variation table tabling the correlation between the concentration (ppm) of Li ions and the variation ($\mu$m) shown in FIG. 7.

FIG. 7 is a correlation diagram showing the correlation between (a) the concentration (ppm) of Li ions and the variation (μm). By expressing such a correlation by, for example, a multidimensional relational expression, it is possible to estimate a variation only by measuring the concentration of Li ions.

Such a relational expression is on the basis of the fact that as the number of times of chemical strengthening treatments increases, the concentration of Li ions in a molten salt increases and, therefore, the chemical strengthening treatment capability drops and thus the variation decreases under the same immersion time and the same temperature. That is, in the chemical strengthening treatment, when the concentration of Li ions is low, the ion-exchange rate is high and thus the variation becomes large, while, as the time and the number of times of chemical strengthening treatments increase, Li ions from the glass substrates 102 are accumulated in the molten salt and thus the concentration of Li ions increases so that the ion-exchange rate decreases and thus the variation decreases.

With respect to (b) the cumulative number and (c) the cumulative time, it is not even necessary to perform direct measurement on the glass substrate 102 or the chemical strengthening treatment solution and the variation is estimated only by indirectly measuring (counting or clocking) the cumulative number or the cumulative time. Therefore, it is possible to grasp a variation of the glass substrate 102 without using a special measuring device and thus it is possible to reduce the inner diameter dimensional error of a magnetic-disk glass substrate while achieving a cost reduction and an increase in efficiency of the manufacturing processes.

The grasping unit 140 may grasp a variation using a relational expression between a reference value such as (a) the concentration, (b) the cumulative number, or (c) the cumulative time and a variation, but may alternatively grasp a variation using a one-to-one mapping variation table. A linear interpolation may be used for interpolation between numerical values described in the variation table.

FIG. 8 is an explanatory diagram showing an example of a variation table tabling the correlation between the concentration (ppm) of Li ions and the variation (μm) of FIG. 7. Herein, without calculating, in real time, the multidimensional relational expression between the concentration of Li ions and the variation as shown in FIG. 7, the variation can be derived from the concentration of Li ions only by referring to the variation table of FIG. 8 prepared in advance. With this configuration, the processing load can be reduced and, further, it is possible to avoid a deviation of the variation due to rounding error when deriving a multidimensional function.

The above memory 150 stores such a variation table, a later-described processing amount table, a later-described strengthening condition table, and so on and allows the grasping unit 140 or the like to refer to the contents of the variation table or the like in response to a request therefrom.

The above inner diameter measuring device 210 measures the inner diameter of the glass substrate 102 before carrying out chemical strengthening in the chemical strengthening treatment bath 130. The inner diameter of the glass substrate 102 is obtained by the actual measurement herein, but may alternatively be, for example, an inner diameter set value (inner diameter estimated value) in the inner peripheral end face polishing process.

In this embodiment, three states are roughly assumed in connection with performing the chemical strengthening process. That is, (i) the state where a chemical strengthening treatment bath 130 optimal for chemically strengthening a single glass substrate is selected from a plurality of chemical strengthening treatment baths 130, (ii) the state where a glass substrate 102 optimal for carrying out the chemical strengthening process by a single chemical strengthening treatment bath 130 is selected from a plurality of glass substrates 102, and (iii) the state where a plurality of glass substrates 102 and a plurality of chemical strengthening treatment baths 130 are combined with each other. A single glass substrate referred to herein includes a concept of a plurality of glass substrates placed in the same glass substrate holder to be simultaneously chemically strengthened. Therefore, a plurality of glass substrates 102 represent a state where groups each including a plurality of glass substrates to be simultaneously chemically strengthened are arranged in a plurality of process lines, respectively.

In the state (i), the above combination determining unit 310 determines, based on variations grasped by the grasping unit 140, a chemical strengthening treatment bath 130, which performs chemical strengthening, so that the inner diameter, after the chemical strengthening process, of a glass substrate 102 whose inner diameter was measured by the inner diameter measuring device 210 becomes a desired value. In the state (ii), the combination determining unit 310 determines, based on a variation, a glass substrate 102 to be subjected to the chemical strengthening process so that the inner diameter thereof after the chemical strengthening process becomes a desired value. In the state (iii), the combination determining unit 310 determines, based on variations, chemical strengthening treatment baths 130, which perform chemical strengthening, so that the inner diameters, after the chemical strengthening process, of a plurality of glass substrates 102 whose inner diameters were measured become a desired value.

In any state, the optimal combination between the glass substrate 102 and the chemical strengthening treatment bath 130 is selected for finally obtaining the glass substrate 102 having the desired inner diameter. Therefore, even if the inner diameter of the glass substrate 102 before the chemical strengthening process changes or even if the chemical strengthening treatment condition of the chemical strengthening treatment solution in the chemical strengthening treatment bath 130 changes with time, it is consequently possible to manufacture a magnetic-disk glass substrate with a small inner diameter (ID) dimensional error.

For such combinations, the combination determining unit 310 may determine the chemical strengthening treatment baths 130, which perform chemical strengthening, so that the sum of squares of differences between final estimated inner diameters of respective combinations when temporarily combining the glass substrates 102 and the chemical strengthening treatment baths 130, and the desired value of the inner diameter becomes minimum. Alternatively, the chemical strengthening treatment baths 130 which perform chemical strengthening may be determined so that the sum of squares of differences between respective combinations of the measured inner diameters and the variations and the desired value of the inner diameter becomes minimum.

Figure 9:
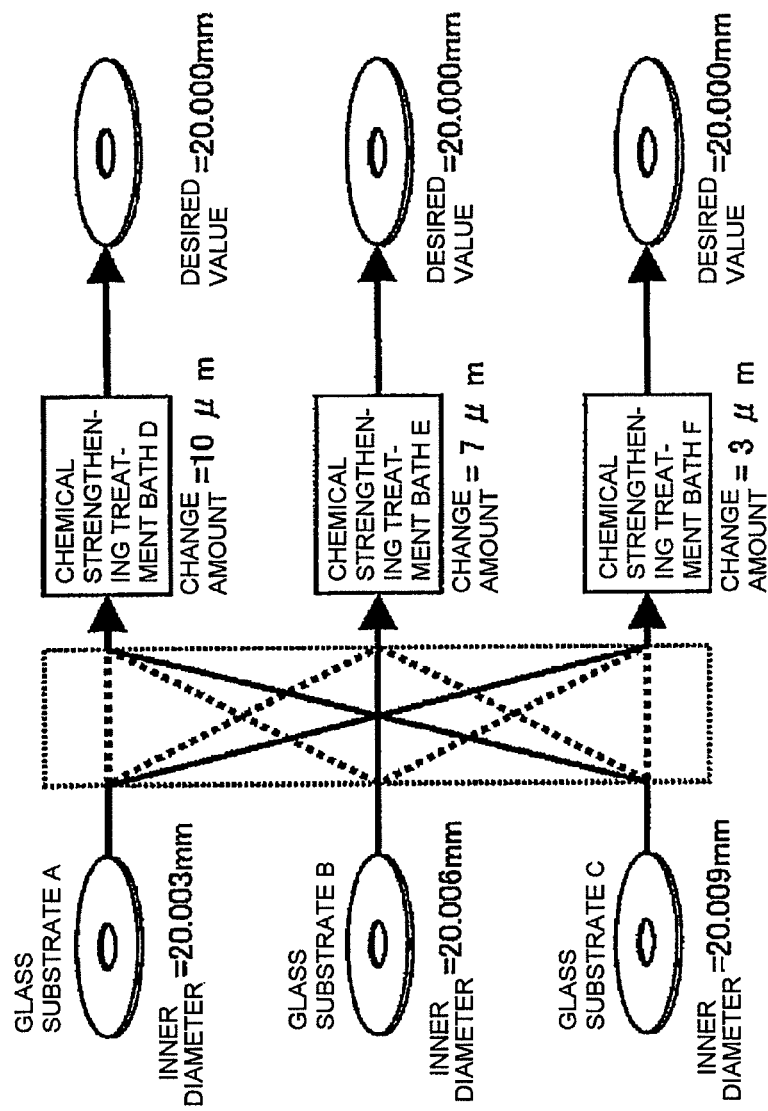
FIG. 9 is an explanatory diagram for explaining a combination determining process by a combination determining unit.

FIG. 9 is an explanatory diagram for explaining a combination determining process by the combination determining unit 310. For example, it is assumed that the inner diameter measuring device 210 measured the inner diameters of three glass substrates A, B, and C in three lines and the inner diameters thereof were 20.003 mm, 20.006 mm, and 20.009 mm, respectively, and further that the grasping device 140 estimated variations of three chemical strengthening treatment baths D, E, and F to be 10 μm, 7 μm, and 3 μm, respectively. Assuming that a final desired value of the inner diameter is 20.000 mm, if combinations between the glass substrates and the chemical strengthening treatment baths are set to A-F, B-E, and C-D, the sum of squares of differences becomes a minimum value of 2 μm².

Even if one of combinations between the glass substrates 102 and the chemical strengthening treatment baths 130 is good, the whole combination including the other combinations is not necessarily optimal. Therefore, with the above configuration using the method of least squares, it is possible to reduce the whole inner diameter dimensional error.

The variation table described above can be obtained by stopping the feedback of the magnetic-disk glass substrate manufacturing system 100 and deriving the correlation between the reference value ((a) concentration, (b) cumulative number, (c) cumulative time, etc.) and the variation in the open-loop control.

That is, when producing a variation table of the concentration of Li ions and the variation, the inner diameters at stages before and after the chemical strengthening process and the concentration of Li ions in the chemical strengthening process are measured at the same timing and the difference between the inner diameters is mapped as a variation to the concentration of Li ions. By performing such mapping with a plurality of concentrations of Li ions, a relational expression or a variation table of the concentration of Li ions and the variation is derived, for example, as in FIG. 7 or FIG. 8.

With respect to (b) the cumulative number or (c) the cumulative time being another reference value, a relational expression is likewise derived by measuring it at the same timing with the inner diameters at stages before and after the chemical strengthening process and then mapping them to each other. In this event, it is preferable that other chemical strengthening treatment conditions such as, for example, the immersion time and the temperature other than the concentration of Li ions be set to be the same during the measurement and the actual manufacturing processes.

(Magnetic-Disk Glass Substrate Manufacturing Method)

By using the magnetic-disk glass substrate manufacturing system 300 described above, a magnetic-disk glass substrate manufacturing method is also provided. This magnetic-disk glass substrate manufacturing method includes a chemical strengthening process of bringing a plurality of disk-shaped glass substrates 102 each formed with a circular hole in its center into contact with chemical strengthening treatment solutions of a plurality of chemical strengthening treatment baths 130, respectively, to exchange part of ions contained in the glass substrates 102 for ions in the chemical strengthening treatment solutions, thereby chemically strengthening the glass substrates 102, and further includes, at a stage preceding to the chemical strengthening process, an inner diameter measuring process of measuring an inner diameter of each of the plurality of glass substrates 102 before the chemical strengthening process, a grasping process of grasping a variation of the inner diameter of the glass substrate 102 to be generated by the chemical strengthening process for each of the plurality of chemical strengthening treatment baths 130, and a combination determining process of determining the chemical strengthening treatment baths 130, that perform chemical strengthening, based on the variations so that the inner diameters of the plurality of glass substrates 102, whose inner diameters are measured, after the chemical strengthening process become a desired value, wherein, in the chemical strengthening process, the plurality of glass substrates 102 are chemically strengthened in the determined chemical strengthening treatment baths 130, respectively.

Herein, by combining the glass substrate 102 and the chemical strengthening treatment bath 130 so as to obtain the predetermined inner diameter, it is possible to reduce the inner diameter dimensional error of a magnetic-disk glass substrate.

As describe above, the combination between the glass substrate and the chemical strengthening treatment bath is adjusted to thereby reduce the inner diameter dimensional error of a magnetic-disk glass substrate. Although sufficient processing accuracy can be obtained by performing such processes, if processes such as (A) adjusting the chemical strengthening treatment condition in the chemical strengthening process and (B) adjusting the processing amount in the inner periphery processing process, which will be described hereinbelow, are added to the above chemical strengthening treatment condition adjusting processes, the errors of the glass substrate itself and the chemical strengthening treatment bath itself can be reduced to some extent and thus it becomes possible to reduce the final inner diameter dimensional error. Hereinbelow, an embodiment added with such adjusting processes will be described.

((A) Adjustment of Chemical Strengthening Treatment Condition in Chemical Strengthening Process)

Figure 10:
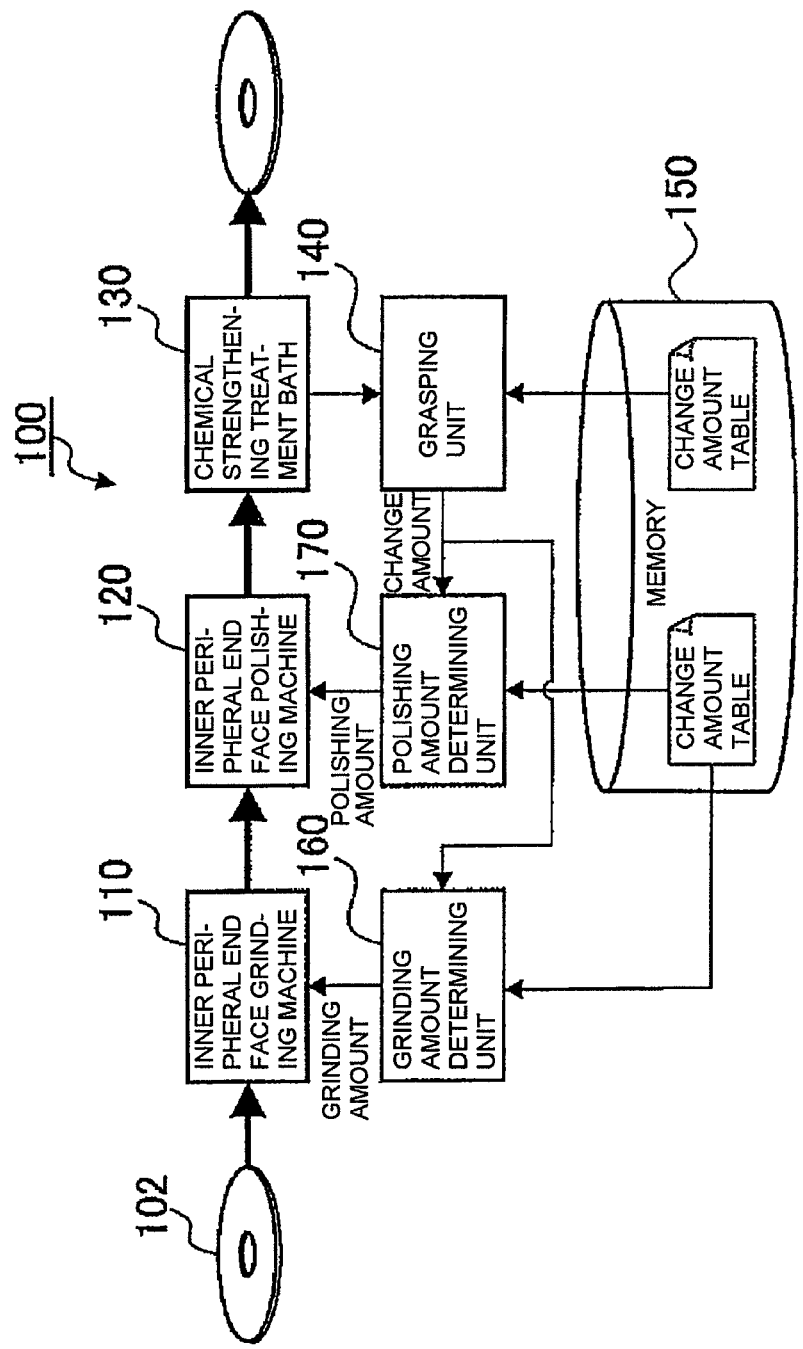
FIG. 10 is a functional block diagram showing a magnetic-disk glass substrate manufacturing system.

FIG. 10 is a functional block diagram showing a magnetic-disk glass substrate manufacturing system 100 capable of adjusting the chemical strengthening treatment condition in the chemical strengthening process. Herein, in order to facilitate the understanding, a description will be given by omitting the adjustment of the combination between the glass substrate and the chemical strengthening treatment bath having been described in detail and paying attention to only the adjustment of the chemical strengthening treatment condition in the chemical strengthening process. The manufacturing system 100 for magnetic-disk glass substrates 102 shown in FIG. 10 is formed by adding a grinding amount determining unit 160 and a polishing amount determining unit 170 to the magnetic-disk glass substrate manufacturing system 300 described above. Since the functions are substantially the same as those of the inner peripheral end face grinding machine 110, the inner peripheral end face polishing machine 120, the chemical strengthening treatment bath 130, the grasping unit 140, and the memory 150 described above, redundant description thereof is omitted and, herein, the grinding amount determining unit 160 and the polishing amount determining unit 170, which differ in structure, will be mainly described.

The grinding amount determining unit 160 and the polishing amount determining unit 170 serve as processing amount determining units and determine, based on a grasped variation, a grinding amount in the inner peripheral end face grinding process and a polishing amount in the inner peripheral end face polishing process so that the inner diameter of the glass substrate 102 after the next chemical strengthening process becomes a desired value. Then, from next time, the glass substrate 102 is processed by reflecting (adding) the set grinding amount and polishing amount on a grinding amount and a polishing amount up to then. That is, the inner diameter is fed back corresponding to the variation to one or both of the inner peripheral end face grinding process and the inner peripheral end face polishing process. Such feedback may be carried out per batch or per day. With this configuration, even if magnetic-disk glass substrates are mass-produced, it is possible to reduce the inner diameter dimensional error among the plurality of glass substrates 102 as compared with conventional.

FIG. 11 is a table showing processing amounts (grinding amount and polishing amount) when a variation is fed back, in a shared manner, to both the inner peripheral end face grinding process and the inner peripheral end face polishing process. For example, when the grasping unit 140 grasps a variation to be 15.00 μm, the total of processing amounts for causing the inner diameter to be a desired value becomes 15.00 μm. Therefore, referring to the processing amount table of FIG. 11, the grinding amount determining unit 160 adds a grinding amount of 13.00 μm (+13.00 μm) and the polishing amount determining unit 170 adds a polishing amount of 2.00 μm (+2.00 μm). Then, the inner peripheral end face grinding machine 110 and the inner peripheral end face polishing machine 120 carry out the processing by reflecting (adding) the set grinding amount and polishing amount, respectively.

The inner peripheral end face grinding process can take a greater machining allowance as compared with the later-described inner peripheral end face polishing process and further the cutting amount per unit time is large, and thus the control is easy. Therefore, it is possible to achieve an increase in efficiency of the manufacturing processes as compared with the inner peripheral end face polishing process.

The variation can be fed back to only one of the inner peripheral end face grinding process and the inner peripheral end face polishing process.

FIG. 12 is a processing amount table for describing the case where a variation is fed back as only a grinding amount of the inner peripheral end face grinding process. Herein, since additional polishing in the inner peripheral end face polishing process is not carried out, an adjustment for the variation is implemented only with the grinding amount. Therefore, if a desired inner diameter value after the chemical strengthening process is constant, grinding amounts take values proportional to variations. In the case of feedback only to the inner peripheral end face polishing process, it is possible to use a similar processing amount table.

FIG. 13 is a table in combination of the variation table and the processing amount table. Referring to this table, it is possible to directly derive a grinding amount and a polishing amount from a reference value serving as a basis of a calculation, i.e. the concentration of Li ions herein, and thus the processing load can be reduced.

With the above closed-loop configuration that grasps a variation and feeds back processing amounts to the inner periphery processing process, the inner diameter dimensional error in the chemical strengthening process can be absorbed in the process at the preceding stage. Thus, it is consequently possible to manufacture a magnetic-disk glass substrate with a smaller inner diameter dimensional error without performing a complicated adjustment of the chemical strengthening treatment conditions.

(Magnetic-Disk Glass Substrate Manufacturing Method)

Using the magnetic-disk glass substrate manufacturing system described above, a magnetic-disk glass substrate manufacturing method is also provided. This magnetic-disk glass substrate manufacturing method further includes, in addition to the process of adjusting the chemical strengthening treatment condition in the chemical strengthening process described above, a processing amount determining process of determining, based on a grasping result of the grasping process, a processing amount of the inner diameter of the glass substrate 102 so that the inner diameter of the glass substrate 102 after the next chemical strengthening process becomes a desired value, wherein, in the inner periphery processing process, the inner peripheral end face of the glass substrate 102 is processed based on the processing amount.

If the adjustment of the processing amount in the inner periphery processing process described above is added to the adjustment of the combination between the glass substrate and the chemical strengthening treatment bath, by the above closed-loop configuration that grasps a variation and feeds back this variation as a grinding amount in the inner peripheral end face grinding process or a polishing amount in the inner peripheral end face polishing process, it is possible to set the grinding amount anticipating the variation caused by the chemical strengthening process and a change in inner diameter dimensional error based on a number of parameters in the chemical strengthening process can be absorbed in the inner peripheral end face grinding process. Thus, it is consequently possible to manufacture a magnetic-disk glass substrate with a smaller inner diameter dimensional error.

The process of adjusting the processing amount in the inner periphery processing process described above can be carried out alone without performing the process of adjusting the combination between the glass substrate and the chemical strengthening treatment bath.

((B) Adjustment of Chemical Strengthening Treatment Condition in Chemical Strengthening Process)

Figure 14:
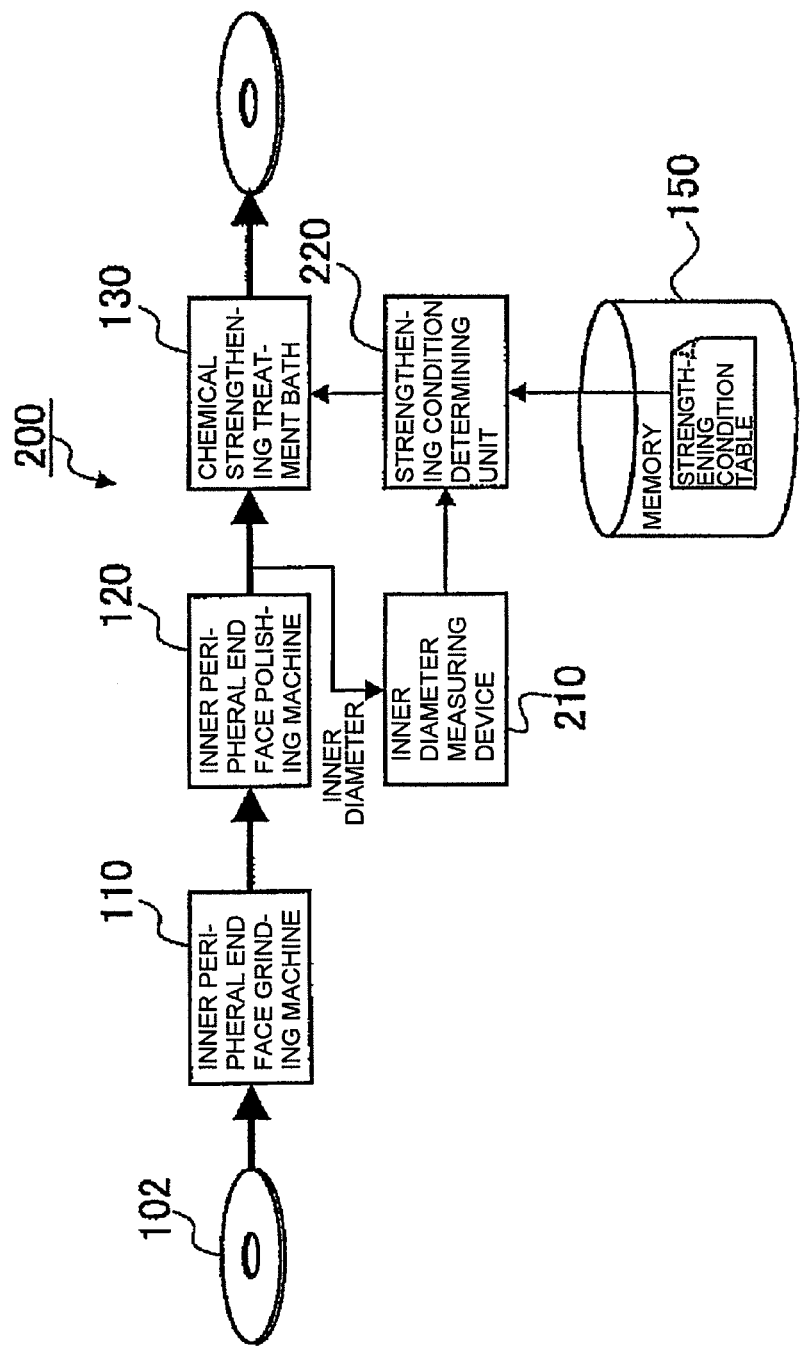
FIG. 14 is a functional block diagram showing a magnetic-disk glass substrate manufacturing system.

FIG. 14 is a functional block diagram showing a magnetic-disk glass substrate manufacturing system 200 capable of adjusting the chemical strengthening treatment condition in the chemical strengthening process. Herein, in order to facilitate the understanding, a description will be given by omitting the adjustment of the combination between the glass substrate and the chemical strengthening treatment bath having been described in detail and paying attention to only the adjustment of the chemical strengthening treatment condition. The magnetic-disk glass substrate manufacturing system 200 of FIG. 14 is formed by adding a strengthening condition determining unit 220 to the magnetic-disk glass substrate manufacturing system 300 described above. Since the functions are substantially the same as those of the inner peripheral end face grinding machine 110, the inner peripheral end face polishing machine 120, the chemical strengthening treatment bath 130, the memory 150, and the inner diameter measuring device 210 described above, redundant description thereof is omitted and, herein, the strengthening condition determining unit 220, which differ in structure, will be mainly described.

The strengthening condition determining unit 220 determines a chemical strengthening treatment condition in the chemical strengthening treatment bath 130 based on a difference between an inner diameter measured by the inner diameter measuring device 210 and a desired inner diameter after the chemical strengthening process. Herein, first, the inner diameter of a glass substrate 102 is measured by the inner diameter measuring device 210 and the difference between it and the final desired inner diameter is derived. Then, the chemical strengthening treatment condition is determined so that a variation in the subsequent chemical strengthening process follows the derived difference. With this configuration, even if the inner diameter of the glass substrate 102 before the chemical strengthening treatment is deviated from a predetermined design value, the final inner diameter of the glass substrate 102 can be made to a desired value by adjusting the variation and thus it is possible to manufacture a magnetic-disk glass substrate with a small inner diameter dimensional error.

Herein, the chemical strengthening treatment condition may be one or two or more conditions selected from the group of (a) the concentration of a specific component contained in a chemical strengthening treatment solution, (b) the immersion time of a glass substrate 102 in a chemical strengthening treatment solution, and (c) the temperature of a chemical strengthening treatment solution.

In the chemical strengthening process using the chemical strengthening treatment bath 130, mainly (a) the concentration of a specific component contained in a chemical strengthening treatment solution, (b) the immersion time of a glass substrate 102 in a chemical strengthening treatment solution, and (c) the temperature of a chemical strengthening treatment solution and a variation of the inner diameter of the glass substrate 102 have a correlation therebetween. Therefore, even if the chemical strengthening process is carried out by fixing one or two or more of the chemical strengthening treatment conditions, the variation can be adjusted by changing the other one or two or more of the chemical strengthening treatment conditions and thus it is possible to further reduce the final inner diameter dimensional error of the glass substrate 102 in the chemical strengthening process.

With respect to (a) the concentration of a specific component, the specific component can be Li ions when the glass substrate 102 is made of an aluminosilicate glass containing Li ions.

When, for example, it is not desirable or possible to adjust the concentration of Li ions as the chemical strengthening treatment condition for the reason that it is not desirable to affect the lifetime of a chemical strengthening treatment salt, the strengthening condition determining unit 220 can adjust one or both of the immersion time and the temperature to thereby cause the inner diameter of the glass substrate 102 to be a desired value.

Likewise, in the case of performing chemical strengthening treatments using a plurality of chemical strengthening treatment baths 130, if it is not desirable or possible to adjust the immersion time for the reason that, by changing the heating time of one of the chemical strengthening treatment baths 130, the finish time differs from that of the other chemical strengthening treatment baths so that the time control over the entire manufacturing site is complicated, one or both of the concentration and the temperature are adjusted. On the other hand, if it is not desirable or possible to adjust the temperature for the reason that if the heating temperature is set, for example, higher than a predetermined temperature, the chemical strengthening treatment bath 130 is heated excessively to cause generation of particles of Fe, SUS, or the like, one or both of the concentration and the immersion time are adjusted.

The strengthening condition determining unit 220 may determine a chemical strengthening treatment condition using a strengthening condition table in which differences between inner diameters measured by the inner diameter measuring device 210 and a desired inner diameter after the chemical strengthening process and chemical strengthening treatment conditions are mapped to each other.

FIG. 15 is an explanatory diagram showing an example of a strengthening condition table tabling the correlation between the difference (μm) and the concentration (ppm) of Li ions. In the strengthening condition table of FIG. 15, the immersion time and the temperature are constant at 180 min and 350oC, respectively, and only the concentration (ppm) of Li ions is a changeable chemical strengthening treatment condition. Accordingly, the difference necessary for reaching the desired inner diameter is derived based on the inner diameter measured by the inner diameter measuring device 210 and the Li concentration is adjusted for changing the inner diameter by the derived difference. For example, in the case of 5 μm shorter than the desired inner diameter, it is possible to obtain a glass substrate with a small inner diameter dimensional error in the subsequent chemical strengthening process by changing the Li concentration to 150 ppm. This changing of the Li concentration is performed by discarding a given amount of a chemical strengthening treatment solution and adding a molten salt of sodium nitrate, potassium nitrate, lithium nitrate, or a mixture thereof.

By the use of such a strengthening condition table, without calculating, in real time, a complicated relational expression between the difference and the chemical strengthening treatment condition, the chemical strengthening treatment condition can be easily derived from the difference only by referring to the strengthening condition table prepared in advance. Accordingly, the processing load can be reduced and, further, it is possible to avoid a deviation of the chemical strengthening treatment condition due to rounding error when deriving a multidimensional function.

The strengthening condition table can be obtained by stopping the feedback of the magnetic-disk glass substrate manufacturing system 200 and deriving the correlation between the concentration of Li ions, the immersion time, and the temperature and the variation in such chemical strengthening treatment conditions in the open-loop control. The variation can be obtained by measuring a difference between the inner diameters before and after the chemical strengthening process.

FIG. 16 is an explanatory diagram showing the correlation between the concentration of Li ions, the immersion time, and the temperature and the variation in such chemical strengthening treatment conditions. In order to produce a final strengthening condition table, as many samples as possible are obtained by shifting the concentration of Li ions, the immersion time, and the temperature within respective allowable ranges, so that it is possible to produce a more accurate strengthening condition table. Then, when using it as a strengthening condition table, constant chemical strengthening treatment conditions (immersion time and temperature in FIG. 15) are first cited and then only data mapped to such chemical strengthening treatment conditions are extracted. For example, if only chemical strengthening treatment conditions of an immersion time of 180 min and a temperature of 350° C. are extracted in FIG. 16, the strengthening condition table of FIG. 15 is produced. When adjusting other chemical strengthening treatment conditions, it is possible to produce a strengthening condition table through the same extraction processing from the table of FIG. 16 showing the correlation.

Using the magnetic-disk glass substrate manufacturing system described above, a magnetic-disk glass substrate manufacturing method is also provided. This magnetic-disk glass substrate manufacturing method further includes, in addition to the process of adjusting the combination between the glass substrate and the chemical strengthening treatment bath described above, a chemical strengthening treatment condition determining process of determining a chemical strengthening treatment condition in the chemical strengthening process based on a difference between a measured inner diameter and a desired inner diameter after the chemical strengthening process, wherein, in the chemical strengthening process, the glass substrate 102 is chemically strengthened based on the determined chemical strengthening treatment condition.

If the adjustment of the chemical strengthening treatment condition in the chemical strengthening process is added to the adjustment of the combination between the glass substrate and the chemical strengthening treatment bath, even if the inner diameter of the glass substrate 102 before the chemical strengthening treatment is deviated from a predetermined design value, the final inner diameter of the glass substrate 102 can be made to a desired value by adjusting the variation and thus it is possible to manufacture a magnetic-disk glass substrate with a smaller inner diameter dimensional error.

The process of adjusting the chemical strengthening treatment condition in the chemical strengthening process described above can be carried out alone without performing the process of adjusting the combination between the glass substrate and the chemical strengthening treatment bath.

Hereinbelow, a specific Example of the embodiments described above will be described. In this Example, a magnetic-disk glass substrate and a magnetic disk were manufactured through the following processes.

(1) Shaping Process and First Lapping Process

First, a molten aluminosilicate glass was molded into a disk shape by direct pressing using upper, lower, and drum molds, thereby obtaining an amorphous plate-like glass. As the aluminosilicate glass, a glass for chemical strengthening was used. Other than the direct pressing, a disk-shaped magnetic-disk glass substrate may be obtained by cutting it out, using a grindstone, from a sheet glass formed by a fusion method, a downdraw method, or a float method. As the aluminosilicate glass, use was made of a glass for chemical strengthening which contains, as main components, $SiO_2$: 58 to 75 wt %, $Al_2O_3$: 5 to 23 wt %, $Li_2O$: 3 to 10 wt %, and $Na_2O$: 4 to 13 wt %. A soda-lime glass or the like can be used instead of the aluminosilicate glass.

Then, lapping was applied to both main surfaces of the plate-like glass, thereby obtaining a disk-shaped glass base member. The lapping was carried out using a double-side lapping machine employing a planetary gear mechanism with the use of alumina-based free abrasive grains. Specifically, the lapping was carried out by pressing lapping surface plates onto both surfaces of the plate-like glass from the upper and lower sides, supplying a grinding liquid containing the free abrasive grains onto the main surfaces of the plate-like glass, and relatively moving the plate-like glass and the surface plates to each other. By this lapping, there was obtained the glass base member having the flat main surfaces.

(2) Cutting-Out Process (Coring, Forming)

Then, the glass base member was cut using a diamond cutter, thereby cutting out a disk-shaped glass substrate from the glass base member. Then, using a cylindrical diamond drill, a circular hole was formed at a center portion of the glass substrate, thereby obtaining a doughnut-shaped glass substrate (coring).

(3) End Face Grinding Process

Then, grinding was applied to an inner peripheral end face and an outer peripheral end face using diamond grindstones, thereby carrying out predetermined chamfering (forming).

(4) Second Lapping Process

Then, second lapping was applied to both main surfaces of the obtained glass substrate in the same manner as in the first lapping process. By performing this second lapping process, fine irregularities formed on the main surfaces in the cutting-out process or an end face polishing process as a preceding process can be removed in advance, so that it becomes possible to complete a subsequent main surface polishing process in a short time.

(5) End Face Polishing Process

Then, the end faces of the glass substrate were mirror-polished by a brush polishing method. In this event, as polishing abrasive grains, use was made of a slurry (free abrasive grains) containing cerium oxide abrasive grains. By this end face polishing process, the end faces of the glass substrate were finished to a mirror surface state that can prevent the generation of dust such as particles.

(6) Main Surface Polishing Process

A first polishing process was first carried out as a main surface polishing process. This first polishing process mainly aims to remove cracks or strains remaining on the main surfaces during the lapping processes described above. In this first polishing process, the main surfaces were polished using a double-side polishing machine having a planetary gear mechanism with the use of a hard resin polisher. Cerium oxide abrasive grains were used as a polishing liquid.

The glass substrate having been subjected to the first polishing process was immersed in respective cleaning baths of neutral detergent, pure water, and IPA (isopropyl alcohol) in turn so as to be cleaned.

Then, a second polishing process was carried out as a main surface polishing process. This second polishing process aims to finish the main surfaces to a mirror surface state. In this second polishing process, the main surfaces were mirror-polished using a double-side polishing machine having a planetary gear mechanism with the use of a soft resin foam polisher. As a polishing liquid, use was made of cerium oxide abrasive grains finer than the cerium oxide abrasive grains used in the first polishing process.

The glass substrate having been subjected to the second polishing process was immersed in respective cleaning baths of neutral detergent, pure water, and IPA (isopropyl alcohol) in turn so as to be cleaned. An ultrasonic wave was applied to each cleaning bath.

(7) Chemical Strengthening Process and Cooling Process

Then, chemical strengthening was applied to the glass substrate having been subjected to the lapping processes and the polishing processes described above. By performing this chemical strengthening process, it is possible to generate high compressive stresses at surface layer portions of the glass substrate and thus to improve the impact resistance thereof.

The chemical strengthening was carried out by preparing a chemical strengthening solution in the form of a mixture of potassium nitrate (60%) and sodium nitrate (40%), heating this chemical strengthening solution to 400oC and preheating the cleaned glass substrate to 300oC, and immersing it in the chemical strengthening solution for about 3 hours.

By performing the immersion treatment in the chemical strengthening solution as described above, Li ions and sodium ions in the surface layers of the glass substrate are replaced by sodium ions and potassium ions in the chemical strengthening solution, respectively, so that the glass substrate is strengthened. The thickness of a compressive stress layer at the inner diameter of the glass substrate in this event was about 100 µm to 200 µm and a variation was 15 µm or less. It was possible to significantly improve the yield by employing in this Example the technique described in the embodiments.

Example

By comparing cases with and without mapping between glass substrates and chemical strengthening treatment baths, the following results were obtained. The number of glass substrate samples is 10,000 and a target value in a table is an inner diameter of 20.0±0.05 mm.

TABLE 1

|  | Ratio within Target Value |
|---|---|
| Example | 100% |
| Comparative Example | 83.6% |

As shown above, it can be understood that the yield is significantly improved.

Subsequently, the glass substrate having been subjected to the chemical strengthening process was immersed in a water bath at 20oC so as to be cooled, and maintained for about 10 minutes. Then, the cooled glass substrate was immersed in concentrated sulfuric acid heated to about 40oC, so as to be cleaned. Further, the glass substrate having been subjected to the sulfuric acid cleaning was immersed in respective cleaning baths of pure water and IPA (isopropyl alcohol) in turn so as to be cleaned. An ultrasonic wave was applied to each cleaning bath.

By performing the first lapping process, the cutting-out process, the second lapping process, the end face polishing process, the main surface polishing process, the chemical strengthening process, and the cooling process as described above, there was obtained a flat, smooth, and high-rigidity magnetic-disk glass substrate.

(8) Precise Cleaning Process

Then, precise cleaning of the magnetic-disk glass substrate formed with a texture was carried out. This is for removing the remnants of the abrasives, iron-based contaminants of foreign origin, and so on that would otherwise cause head crash or thermal asperity failure, thereby obtaining the glass substrate with the smooth and clean surfaces. In this precise cleaning process, water rinsing cleaning and IPA cleaning processes were carried out after cleaning with an alkaline aqueous solution.

(9) Magnetic Disk Manufacturing Process

On each of both surfaces of the glass substrate obtained through the processes described above, an adhesive layer of a Cr alloy, a soft magnetic layer of a CoTaZr-group alloy, an underlayer of Ru, a perpendicular magnetic recording layer of a CoCrPt-group alloy, a protective layer of hydrogenated carbon, and a lubricating layer of perfluoropolyether were formed in this order, thereby manufacturing a perpendicular magnetic recording disk. This structure is one example of the structure of a perpendicular magnetic disk. Magnetic layers and so on may be formed as an in-plane magnetic disk.

With respect to the obtained magnetic disk, it was confirmed that there was no occurrence of defect on the films such as the magnetic layers due to foreign matter. A glide test was performed and there was observed no hit (a head grazes a projection on the surface of a magnetic disk) or crash (a head collides with a projection on the surface of a magnetic disk). Further, a reproduction test was performed using a magnetoresistive head and there was observed no malfunction in reproduction due to thermal asperity.

While the preferred embodiments of this invention have been described with reference to the accompanying drawings, it is needless to say that this invention is not limited thereto. It is obvious that a person skilled in the art can think of various modified examples or revised examples within the scope described in claims and it is understood that those naturally also belong to the technical scope of this invention.

This invention is applicable to a magnetic-disk glass substrate manufacturing method including a chemical strengthening process that ion-exchanges part of a glass substrate to carry out chemical strengthening thereof, a magnetic disk manufacturing method, a magnetic disk, and a magnetic-disk glass substrate manufacturing system.

This application is based upon and claims the benefit of priority from Japanese Patent Application No. 2007-22418, Japanese Patent Application No. 2007-22419, and Japanese Patent Application No. 2007-22420, filed on Jan. 31, 2007, the disclosure of which is incorporated herein in its entirety by reference.

The invention claimed is:

1. A magnetic-disk glass substrate manufacturing method comprising a chemical strengthening step of bringing a disk-shaped glass substrate formed with a circular hole in its center into contact with a chemical strengthening treatment solution of one of a plurality of chemical strengthening treatment baths to exchange part of ions contained in said glass substrate for ions in said chemical strengthening treatment solution, thereby chemically strengthening said glass substrate, said method further comprising:
    an inner diameter measuring step of measuring an inner diameter of said glass substrate before said chemical strengthening step;
    a grasping step of grasping a variation of the inner diameter of the glass substrate to be caused to occur by said chemical strengthening step of each of said plurality of chemical strengthening treatment baths,
    wherein said grasping step grasps a variation of the inner diameter based on an ion concentration of ions exchanged from strengthening treatments of glass substrates in the chemical strengthening treatment solution in accordance with the number of strengthening treatments of glass substrates treated by the chemical strengthening treatment solution; and
    a combination determining step of determining the chemical strengthening treatment bath, that performs chemical strengthening on said glass substrate, based on said grasping step,
    so that the inner diameter of said glass substrate, whose inner diameter is measured, becomes a desired value after said chemical strengthening step; and
    wherein, in said chemical strengthening step, said glass substrate is chemically strengthened in said determined chemical strengthening treatment bath.

2. A magnetic-disk glass substrate manufacturing method comprising a chemical strengthening step of bringing one of a plurality of disk-shaped glass substrates each formed with a circular hole in its center into contact with a chemical strengthening treatment solution of a chemical strengthening treatment bath to exchange part of ions contained in said glass substrate for ions in said chemical strengthening treatment solution, thereby chemically strengthening said glass substrate, said method further comprising:
    an inner diameter measuring step of measuring an inner diameter of each of said plurality of glass substrates before said chemical strengthening step;
    a grasping step of grasping a variation of the inner diameter of each of said plurality of glass substrates to be caused to occur by said chemical strengthening step,
    wherein said grasping step grasps a variation of the inner diameter based on an ion concentration of ions exchanged from strengthening treatments of glass substrates in the chemical strengthening treatment solution in accordance with the number of strengthening treatments of glass substrates treated by the chemical strengthening treatment solution; and
    a combination determining step of determining the one of a plurality of glass substrates to be subjected to said chemical strengthening step based on said grasping step,
    so that the inner diameter of said determined glass substrate thereof becomes a desired value after said chemical strengthening step; and
    wherein, in said chemical strengthening step, said determined glass substrate is chemically strengthened in said chemical strengthening treatment bath.

3. A magnetic-disk glass substrate manufacturing method comprising a chemical strengthening step of bringing a plurality of disk-shaped glass substrates each formed with a circular hole in its center into contact with chemical strengthening treatment solutions of a plurality of chemical strengthening treatment baths, respectively, to exchange part of ions contained in said glass substrates for ions in said chemical strengthening treatment solutions, thereby chemically strengthening said glass substrates, said method further comprising:
    an inner diameter measuring step of measuring an inner diameter of each of said plurality of glass substrates before said chemical strengthening step;
    a grasping step of grasping a variation of the inner diameter of each of said plurality of glass substrates to be caused to occur by said chemical strengthening step for each of said plurality of chemical strengthening treatment baths,
    wherein said grasping step grasps a variation of the inner diameter based on an ion concentration of ions exchanged from strengthening treatments of glass substrates in the strengthening treatment solution in accordance with the number of strengthening treatments of glass substrates treated by the chemical strengthening treatment solution; and
    a combination determining step of determining the chemical strengthening treatment baths, that perform chemical strengthening, based on said grasping step,
    so that the inner diameters of said plurality of glass substrates, whose inner diameters are measured, become a desired value after said chemical strengthening step; and
    wherein, in said chemical strengthening step, said plurality of glass substrates are chemically strengthened in said determined chemical strengthening treatment baths, respectively.

4. A magnetic-disk glass substrate manufacturing method according to claim 3, wherein said combination determining step determines the chemical strengthening treatment baths, for performing chemical strengthening, so that the sum of squares of differences becomes minimum between the desired value of the inner diameter and final estimated inner diameters resulting from respective combinations obtained when said glass substrates and said chemical strengthening treatment baths are temporarily combined.

5. A magnetic-disk glass substrate manufacturing method comprising: an inner diameter processing step of processing an inner peripheral end face of a circular hole of a disk-shaped glass substrate formed with the circular hole in its center; and a chemical strengthening step of bringing said glass substrate into contact with a chemical strengthening treatment solution to exchange part of ions contained in said glass substrate for ions in said chemical strengthening treatment solution, thereby chemically strengthening said glass substrate, said method further comprising:

a grasping step of grasping a deformation of an inner diameter of the circular hole of the glass substrate, wherein said grasping step grasps a deformation of the inner diameter based on an ion concentration of ions exchanged from strengthening treatments of glass substrates in the chemical strengthening treatment solution in accordance with the number of strengthening treatments of glass substrates treated by the chemical strengthening treatment solution, and wherein, in said inner diameter processing step, based on a grasping result of said grasping step, the inner peripheral end face of the circular hole of said glass substrate is processed so that the inner diameter of the circular hole after the subsequent chemical strengthening step becomes a desired shape.

6. A magnetic-disk glass substrate manufacturing method comprising: an inner diameter processing step of processing an inner peripheral end face of a circular hole of a disk-shaped glass substrate formed with the circular hole in its center; and a chemical strengthening step of bringing said glass substrate into contact with a chemical strengthening treatment solution to exchange part of ions contained in said glass substrate for ions in said chemical strengthening treatment solution, thereby chemically strengthening said glass substrate, said method further comprising:

a grasping step of grasping a variation of an inner diameter of the circular hole of the glass substrate to be deformed, wherein said grasping step grasps a variation of the inner diameter based on an ion concentration of ions exchanged from strengthening treatments of glass substrates in the chemical strengthening treatment solution in accordance with the number of strengthening treatments of glass substrates treated by the chemical strengthening treatment solution;

and a processing amount determining step of determining, based on a grasping result of said grasping step, a processing amount of the inner diameter of the circular hole of said glass substrate so that the inner diameter of the circular hole of said glass substrate after the subsequent chemical strengthening step becomes a desired value; wherein, in said inner diameter processing step, the inner peripheral end face of the circular hole of said glass substrate is processed based on said processing amount.

7. A magnetic-disk glass substrate manufacturing method according to claim 5 or 6, wherein said inner diameter processing step comprises an inner peripheral end face grinding step of grinding the inner peripheral end face of the circular hole and an inner peripheral end face polishing step of polishing the inner peripheral end face of the circular hole and using the result of the grasping result of said grasping step is carried out by one or both of said inner peripheral end face grinding step and said inner peripheral end face polishing step.

8. A magnetic-disk glass substrate manufacturing method according to claim 7, wherein said grasping step grasps the variation from a difference between inner diameters of said glass substrate before and after said chemical strengthening step.

9. A magnetic-disk glass substrate manufacturing method according to any of claims 1 to 3 and 6, wherein a variation of the inner diameter decreases in accordance with a lithium ion concentration in the chemical strengthening treatment solution.

10. A magnetic-disk glass substrate manufacturing method according to claim 5, wherein a deformation in the inner diameter decreases in accordance with a lithium ion concentration in the chemical strengthening treatment solution.

11. A magnetic-disk glass substrate manufacturing method comprising a chemical strengthening step of bringing a disk-shaped glass substrate formed with a circular hole in its center into contact with a chemical strengthening treatment solution to exchange part of ions contained in said glass substrate for ions in said chemical strengthening treatment solution, thereby chemically strengthening said glass substrate, said method further comprising:

a circular hole inner diameter measuring step of measuring an inner diameter of said circular hole of said glass substrate before said chemical strengthening step; and a chemical strengthening treatment condition determining step of determining a chemical strengthening treatment condition of said chemical strengthening step based on a difference between said measured inner diameter of said circular hole and a desired inner diameter of said circular hole, after said chemical strengthening step; wherein, in said chemical strengthening step, said glass substrate is chemically strengthened based on said determined chemical strengthening treatment condition, and wherein said difference between said measured inner diameter and desired inner diameter is based on an ion concentration of ions exchanged from strengthening treatments of glass substrates in the chemical strengthening treatment solution in accordance with the number of strengthening treatments of glass substrates treated by the chemical strengthening treatment solution.

12. A magnetic-disk glass substrate manufacturing method according to claim 11, wherein said chemical strengthening treatment condition is an immersion time of said glass substrate in said chemical strengthening treatment solution.

13. A magnetic-disk glass substrate manufacturing method according to claim 11, wherein said chemical strengthening treatment condition determining step determines the chemical strengthening treatment condition using a strengthening condition table in which said difference and said chemical strengthening treatment condition are mapped to each other.

14. A magnetic-disk glass substrate manufacturing method according to claim 11, wherein a difference in the inner diameter decreases in accordance with a lithium ion concentration in the chemical strengthening treatment solution.

* * * * *